United States Patent [19]

Hotta et al.

[11] Patent Number: 5,680,637
[45] Date of Patent: Oct. 21, 1997

[54] COMPUTER HAVING A PARALLEL OPERATING CAPABILITY

[75] Inventors: Takashi Hotta; Yasuhiro Nakatsuka; Shigeya Tanaka; Hiromichi Yamada; Hideo Maejima, all of Hitachi, Japan

[73] Assignee: Hitachi, Ltd., Tokyo, Japan

[21] Appl. No.: 599,856

[22] Filed: Feb. 13, 1996

Related U.S. Application Data

[63] Continuation of Ser. No. 877, Jan. 5, 1993, abandoned.

[30] Foreign Application Priority Data

Jan. 6, 1992 [JP] Japan ................................. 4-000029

[51] Int. Cl.$^6$ ................................................. G06F 9/30
[52] U.S. Cl. .......................... 395/800; 395/391; 395/392; 395/384; 395/382
[58] Field of Search .................................. 395/800, 375, 395/397, 384, 382, 391

[56] References Cited

U.S. PATENT DOCUMENTS 5,136,691 8/1992 Baror ......................................... 395/200
5,163,139 11/1992 Haugh et al. ............................ 395/375

FOREIGN PATENT DOCUMENTS 2-130634 of 1990 Japan .

OTHER PUBLICATIONS

Johnson, William *Superscalor Processor Design,* 1991 Prentice Hall, Inc. pp. 5, 6, 25, 105–106, 177, 180–181, 240.
Cohn, R. et al, "Architecture and Compiler Tradeoffs for a Long Instruction Word Microprocessor", 3rd International Conference on Architectural Support for Programming Languages and Operating Systems, 1989, pp. 2–14.

Yoshida et al. (1991) "The Approach to Multiple Instruction Execution in Gmicro/400 Processor" (185–195).
*Computer Architecture News,* "Software Prefetching", D. Callahan, et al., Apr. 19, 1991, No. 2, New York, New York.
*Computer Architecture News,* "An Architecture for Software–Controlled Data Prefetching", A.C. Klaiber, et al., May 19, 1991, No. 3, 18th Annual Int. on Computer Architecture, New York, New York.
*Proceedings Advanced Computer Technology, Reliable Systems and Applications,* "HARP: A VLIW RISC Processor", P.A. Findlay, et al., 5th Annual Computer Conference, Bologna, May 13–16, 1991.
*Computer Architecture A Quantitative Approach,* "Advanced Pipelining–Taking Advantage of More Instruction–Level Parallelism".
"A Variable Instruction Stream Extension to the VLIW Architecture", A. Wolfe, et al.

*Primary Examiner*—Larry D. Donaghue
*Attorney, Agent, or Firm*—Antonelli, Terry, Stout & Kraus, LLP.

[57] ABSTRACT

A RISC processor is arranged to reduce a code size, make the hardware less complicated, execute a plurality of operations for one machine cycle, and enhance the performance. The processor is capable of executing N instruction each having a short word length for indicating a single operation or an instruction having a long word length for indicating M (N<M) operations. When the number of operations to be executed in parallel is large, the long-word instruction is used. When it is small, the short-word instruction is used. A competition between the long-word instructions is detected by hardware and a competition between the short-word instructions only is detected by software. The simplification of the hardware brings about improvement of a machine cycle, improvement of a code cache hit ratio caused by the reduction of a code size and increase of the number of operations to be executed in parallel for the purpose of enhancing the performance.

7 Claims, 36 Drawing Sheets

FIG.3

| | INSTRUCTION FORMAT |
|---|---|
| BASIC INSTRUCTION | <table><tr><td></td><td></td><td>4</td><td>5</td><td>5</td><td>5</td></tr><tr><td>0</td><td>OP</td><td>CC</td><td>S1</td><td>S2</td><td>T</td></tr></table> ←—— 32BITS ——→ |
| BRANCH INSTRUCTION | \| 0 \| OP \| d \| |
| LOAD AND STORE INSTRUCTION | <table><tr><td></td><td></td><td>3</td><td>1</td><td>5</td><td>5</td><td>5</td></tr><tr><td>0</td><td>OP</td><td>SIZE</td><td>F</td><td>S1</td><td>S2</td><td>T</td></tr></table> |
| COMPOUND INSTRUCTION | <table><tr><td>1 1</td><td>5</td><td>5</td><td>5</td><td>5</td><td>5</td><td>5</td></tr><tr><td>1 L</td><td>I1</td><td>I2</td><td>IT</td><td>J1</td><td>J2</td><td>JT</td></tr></table> <table><tr><td>5</td><td>5</td><td>5</td><td>2</td><td>5</td><td>5</td><td>5</td></tr><tr><td>M1</td><td>M2</td><td>MT</td><td>A</td><td>A1</td><td>A2</td><td>AT</td></tr></table> <table><tr><td>5</td><td>5</td><td>5</td><td>5</td><td>5</td><td>5</td></tr><tr><td>N1</td><td>N2</td><td>NT</td><td>B</td><td>B1</td><td>B2</td><td>BT</td></tr></table> <table><tr><td>4</td><td>4</td><td>4</td><td>18</td><td>2</td></tr><tr><td>SIZE</td><td>F J</td><td>CC</td><td>d</td><td>N</td></tr></table> |

FIG.4

| | NEMONIC | OPERATION | SUPPLEMENT |
|---|---|---|---|
| BASIC INSTRUCTION | ADD  S1,S2,T | R(S1)+R(S2) → R(T) | |
| | SUB  S1,S2,T | R(S1)−R(S2) → R(T) | |
| | AND  S1,S2,T | R(S1)∪R(S2) → R(T) | 0 0 0 0  CONSTANTLY UNSET<br>0 0 0 1  CONSTANTLY SET<br>0 0 1 0  =<br>0 0 1 1  RESULT IS POSITIVE<br>0 1 0 0  RESULT IS NEGATIVE |
| | OR   S1,S2,T | R(S1)∩R(S2) → R(T) | |
| | EOR  S1,S2,T | R(S1)(+)R(S2) → R(T) | |
| | NOT  S1,T | R(S1) → R(T) | |
| | FADD S1,S2,T | FR(S1)+FR(S2) → FR(T) | |
| | FSUB S1,S2,T | FR(S1)−FR(S2) → FR(T) | |
| | FMUL S1,S2,T | FR(S1)×FR(S2) → FR(T) | |
| | NOP | NOTHING TO DO | |
| BRANCH | BRA  d | PC+d → PC | |
| LOAD AND STORE INSTRUCTION | ST   S1,S2 | R(S1) IS WRITTEN IN THE MEMORY POINTED BY R(S2). | SIZE FIELD |
| | LD   S1,S2,T | DATA ON THE MEMORY POINTED BY R(S1)+R(S2) IS WRITTEN IN R(T). | CODE   MEANING<br>0 0 0   1 WORD<br>0 0 1   2 WORD<br>0 1 0   4 WORD<br>0 1 1   8 WORD<br>1 0 0   16 WORD |
| | FST  S1,S2 | FR(S1) IS WRITTEN IN THE MEMORY POINTED BY R(S2). | |
| | FLD  S1,S2,T | DATA ON THE MEMORY POINTED BY R(S1)+R(S2) IS WRITTEN IN FR(T). | |

FIG.5

| | OPERATION | SUPPLEMENT |
|---|---|---|
| LOAD AND STORE OPERATION | LOAD AND STORE ARE EXECUTED ON THE ASSUMPTION THAT I1, I2, SIZE, F, IT FIELDS ARE S1, S2, SIZE, F, T FIELDS OF THE BASIC INSTRUCTIONS. | L=1···LOAD<br>L=0···STORE<br>F=1···FR,  F=0···R |
| INTEGER OPERATION | WHEN J≠"1111", AN OPERATION POINTED BY J FIELD IS EXECUTED FOR R(J1) AND R(J2) AND STORED IN R(JT) | J FIELD<br>0000 ADD, 0001 SUB<br>0010 AND, |
| | WHEN J≠"1111", IF NO DATA POINTED BY R(J1)+R(J2) IS STORED IN CACHE, THE DATA IS TRANSFERRED FROM THE MEMORY TO THE CACHE. | |
| FIRST FLOATING POINT OPERATION | FR(M1)×FR(M2) → FR(MT) | |
| SECOND FLOATING POINT OPERATION | AN OPERATION INDICATED BY AN A FIELD IS PERFORMED FOR FR(A1) AND FR(A2) AND IS STORED IN FR(AT). | A FIELD<br>CODE \| MEANING<br>0 0 \| FADD<br>0 1 \| FSUB |
| THIRD FLOATING POINT OPERATION | FR(N1)×FR(N2) → FR(NT) | |
| FOURTH FLOATING POINT OPERATION | AN OPERATION POINTED BY A B FIELD IS PERFORMED FOR FR(B1) AND FR(B2) AND IS STORED IN FR(BT). | B FIELD IS THE SAME AS THE A FIELD. |
| FLOW CONTROL | THE RESULT OF THE INTEGER OPERATION INSTURCITON IS DETERMINED ACCORDING TO THE CC FIELD. IF THE CONDITION IS MET, THE FLOW IS BRANCHED INTO PC+D. | N FIELD<br>CODE \| MEANING<br>0 0 \| 0: NOP INSERT<br>0 1 \| 1: NOP INSERT<br>1 0 \| 2: NOP INSERT<br>1 1 \| 3: NOP INSERT |

FIG.10

| | | | ADDRESS |
|---|---|---|---|
| | | | 0 |
| INSTRUCTION 1 L | | | 4 |
| | | | 8 |
| | B(1) | B(2) | 12 |
| | | | 16 |
| INSTRUCTION 3 L | | | 20 |
| | B(3) | B(4) | 24 |
| | B(5) | B(6) | 28 |
| | A(1) | A(2) | } S INSTRUCTION 12 | 32 |
| INSTRUCTION 5 L | A(3) | A(4) | | ---- |
| | B(7) | B(8) | | |
| | B(9) | B(10) | | |
| | A(5) | A(6) | } S INSTRUCTION 14 |
| INSTRUCTION 7 L | A(7) | A(8) | |
| | B(11) | B(12) | |
| | B(13) | B(14) | |
| | A(9) | A(10) | } S INSTRUCTION 16 |
| INSTRUCTION 9 L | A(11) | A(12) | |
| | B(15) | B(16) | |
| | B(17) | B(18) | |
| | A(13) | A(14) | } S INSTRUCTION 18 |
| INSTRUCTION 11 L | A(15) | A(16) | |
| | B(19) | B(20) | |
| | B(21) | B(22) | |
| | A(17) | A(18) | } S INSTRUCTION 20 |
| INSTRUCTION 13 L | A(19) | A(20) | |
| | B(23) | B(24) | |
| | A(21) | A(22) | } S INSTRUCTION 22 |
| INSTRUCTION 15 L | A(23) | A(24) | |

FIG.12

| Instruction | LOAD AND STORE OPERATION  L: 16 WORDS LOAD  S: 8 WORDS STORE  X: NOTHING TO DO | INTEGER OPERATION  X: NOTHING TO DO | FIRST FLOATING POINT OPERATION  ○: FR0×FR31→FR8  △: FR2×FR31→FR10  X: NOTHING TO DO | SECOND FLOATING POINT OPERATION  ○: FR4+FR8→FR12  △: FR6+FR10→FR14  X: NOTHING TO DO | THIRD FLOATING POINT OPERATION  ○: FR1×FR31→FR9  △: FR3×FR31→FR11  X: NOTHING TO DO | FOURTH FLOATING POINT OPERATION  ○: FR5+FR9→FR13  △: FR7+FR11→FR15  X: NOTHING TO DO | FLOW CONTROL  X: CONSTANTLY UNSET |
|---|---|---|---|---|---|---|---|
| INSTRUCTION 1 | L | X | X | X | X | X | X |
| INSTRUCTION 2 | X | X | X | X | X | X | X |
| INSTRUCTION 3 | L | X | X | X | X | X | X |
| INSTRUCTION 4 | X | X | X | X | X | X | X |
| INSTRUCTION 5 | L | X | ○ | X | X | X | X |
| INSTRUCTION 6 | X | X | △ | ○ | ○ | X | X |
| INSTRUCTION 7 | L | X | ○ | △ | △ | ○ | X |
| INSTRUCTION 8 | X | X | △ | ○ | ○ | △ | X |
| INSTRUCTION 9 | L | X | ○ | △ | △ | ○ | X |
| INSTRUCTION 10 | X | X | △ | ○ | ○ | △ | X |
| INSTRUCTION 11 | L | X | ○ | △ | △ | ○ | X |
| INSTRUCTION 12 | S | X | △ | ○ | ○ | △ | X |
| INSTRUCTION 13 | X | X | ○ | △ | △ | ○ | X |
| INSTRUCTION 14 | S | X | △ | ○ | ○ | △ | X |
| INSTRUCTION 15 | X | X | X | △ | ○ | △ | X |
| INSTRUCTION 16 | S | X | X | ○ | △ | ○ | X |
| INSTRUCTION 17 | X | X | X | △ | X | △ | X |
| INSTRUCTION 18 | S | X | X | X | X | ○ | X |
| INSTRUCTION 19 | X | X | X | X | X | X | X |
| INSTRUCTION 20 | S | X | X | X | X | X | X |
| INSTRUCTION 21 | X | X | X | X | X | X | X |
| INSTRUCTION 22 | S | X | X | X | X | X | X |

FIG.20
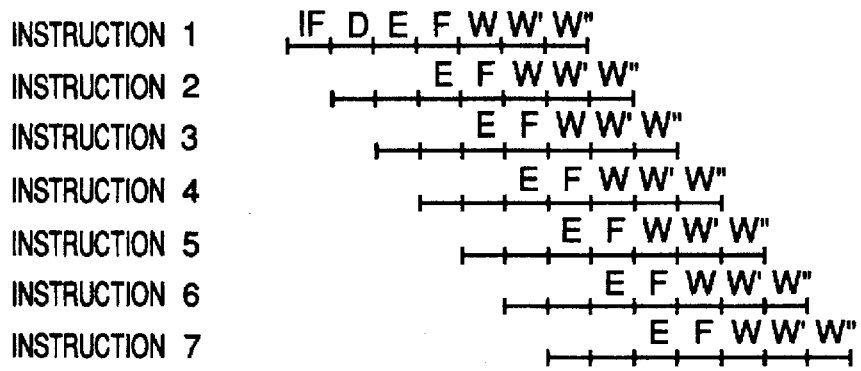
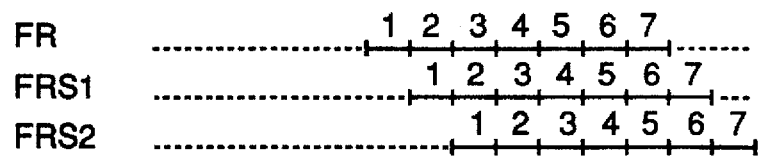
FIG.21
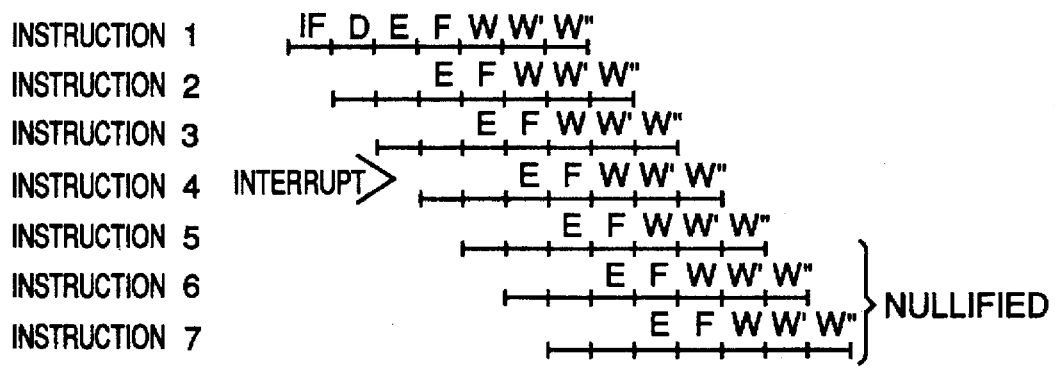
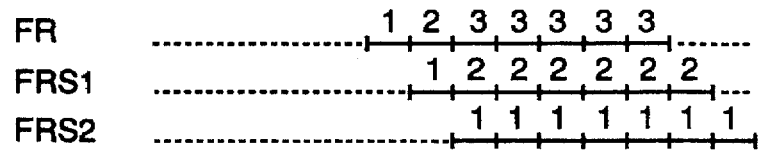

FIG.22
INSTRUCTION 4
INSTRUCTION 5
INSTRUCTION 6
INSTRUCTION 7
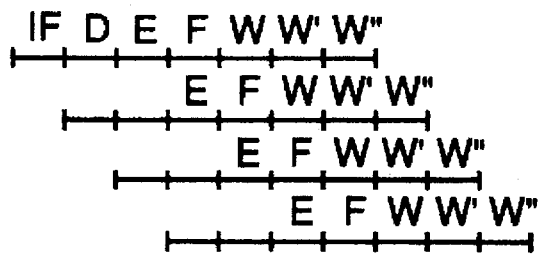
FR
FRS1
FRS2
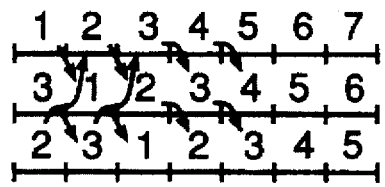

FIG.23

| MODE | INPUT | | | OUTPUT | | | | |
|---|---|---|---|---|---|---|---|---|
| | BUB (116) | C000 (1310-1) | CA30 (1309-1) | FIRST INSTRUCTION REGISTER | SECOND INSTRUCTION REGISTER | THIRD INSTRUCTION REGISTER | FOURTH INSTRUCTION REGISTER | PC |
| ONE-WORD INSTRUCTION MODE 1 | 0 | 0 | 0 | C0 | C1 | — | — | +2 |
| ONE-WORD INSTRUCTION MODE 2 | 0 | 0 | 1 | C2 | C3 | — | — | +2 |
| FOUR-WORD INSTRUCTION MODE | 0 | 1 | * | C0 | C1 | C2 | C3 | +4 |
| COMPETITION MODE | 1 | * | * | LIKE THE PREVIOUS CYCLE | LIKE THE PREVIOUS CYCLE | LIKE THE PREVIOUS CYCLE | LIKE THE PREVIOUS CYCLE | +0 |
| NO-OPERATION INSTRUCTION MODE | * | * | * | NOP | NOP | NOP | NOP | +0 |

FIG.24

| OPERATING UNIT | SOURCE | ONE-WORD INSTRUCTION | FOUR-WORD INSTRUCTION |
|---|---|---|---|
| FIRST ALU | 1 | J1 | I1 |
| | 2 | J2 | I2 |
| SECOND ALU | 1 | A1 | J1 |
| | 2 | A2 | J2 |
| FIRST MULTIPLIER | 1 | J1 | M1 |
| | 2 | J2 | M2 |
| SECOND MULTIPLIER | 1 | A1 | N1 |
| | 2 | A2 | N2 |
| FIRST ADDER | 1 | J1 | A1 |
| | 2 | J2 | A2 |
| SECOND ADDER | 1 | A1 | B1 |
| | 2 | A2 | B2 |

FIG.29
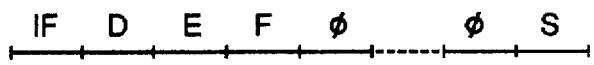
INSTRUCTION 1
(CACHELESS)
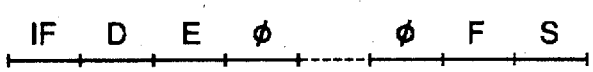
INSTRUCTION 2
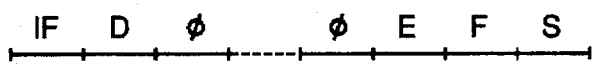
INSTRUCTION 3
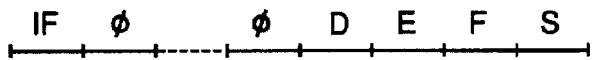
INSTRUCTION 4

FIG.31

| | INSTRUCTION FORMAT |
|---|---|
| BASIC INSTRUCTION | 0 \| OP \| CC(4) \| S1(5) \| S2(5) \| T(5) — 32BITS |
| BRANCH INSTRUCTION | 0 \| OP \| d |
| LOAD AND STORE INSTRUCTION | 0 \| OP \| SIZE(3) \| F(1) \| S1(5) \| S2(5) \| T(5) |
| COMPOUND INSTRUCTION | 1 \| L(1) \| I1(5) \| I2(5) \| IT(5) \| J1(5) \| J2(5) \| JT(5) <br> M1(7) \| I(1) \| MT(7) \| A(2) \| A1(7) \| I(1) \| AT(7) <br> N1(7) \| I(1) \| NT(7) \| B(2) \| B1(7) \| I(1) \| BT(7) <br> SIZE(4) \| F(4) \| J(4) \| CC(4) \| d(18) \| N(2) |

FIG.32

|  | OPERATION | SUPPLEMENT |
|---|---|---|
| LOAD AND STORE OPERATION | LOAD AND STORE ARE EXECUTED ON THE ASSUMPTION THAT I1, I2, SIZE, F, IT FIELDS ARE S1, S2, SIZE, F, T FIELDS OF THE BASIC INSTRUCTIONS. | L=1···LOAD<br>L=0···STORE<br>F=1···FR, F=0···R |
| INTEGER OPERATION | WHEN J≠"1111", AN OPERATION POINTED BY J FIELD IS EXECUTED FOR R(J1) AND R(J2) AND STORED IN R(JT) | J FIELD<br>0000 ADD, 0001 SUB<br>0010 AND, |
| | WHEN J≠"1111", IF NO DATA POINTED BY R(J1)+R(J2) IS STORED IN CACHE, THE DATA IS TRANSFERRED FROM THE MEMORY TO THE CACHE. | JT FIELD<br>INDICATES THE NUMBER OF WORDS OF DATA TO BE TRANSFER |
| FIRST FLOATING POINT OPERATION | FR(M1)×FR(M2) → FR(MT) | |
| SECOND FLOATING POINT OPERATION | AN OPERATION INDICATED BY AN A FIELD IS PERFORMED FOR FR(A1) AND FR(A2) AND IS STORED IN FR(AT). | A FIELD<br>CODE \| MEANING<br>0 0 \| FADD<br>0 1 \| FSUB |
| THIRD FLOATING POINT OPERATION | FR(N1)×FR(N2) → FR(NT) | |
| FOURTH FLOATING POINT OPERATION | AN OPERATION POINTED BY A B FIELD IS PERFORMED FOR FR(B1) AND FR(B2) AND IS STORED IN FR(BT). | B FIELD IS THE SAME AS THE A FIELD. |
| FLOW CONTROL | THE RESULT OF THE INTEGER OPERATION INSTURCITON IS DETERMINED ACCORDING TO THE CC FIELD. IF THE CONDITION IS MET. | N FIELD<br>CODE \| MEANING<br>0 0 \| 0: NOP INSERT<br>0 1 \| 1: NOP INSERT<br>1 0 \| 2: NOP INSERT<br>1 1 \| 3: NOP INSERT |

FIG.33

| | INSTRUCTION FORMAT |
|---|---|
| BASIC INSTRUCTION | 0 \| OP \| CC(4) \| S1(5) \| S2(5) \| T(5) — 32BITS |
| BRANCH INSTRUCTION | 0 \| OP \| d |
| LOAD AND STORE INSTRUCTION | 0 \| OP \| SIZE(3) \| F(1) \| S1(5) \| S2(5) \| T(5) |
| COMPOUND INSTRUCTION | 1(1) \| L(1) \| I1(5) \| I2(5) \| IT(5) \| J1(5) \| J2(5) \| JT(5)<br>M1(5) \| M2(5) \| MT(5) \| A(2) \| A1(5) \| A2(5) \| AT(5)<br>N1(5) \| N2(5) \| NT(5) \| B(2) \| B1(5) \| B2(5) \| BT(5)<br>SIZE(4) \| F(4) \| J(4) \| CC(4) \| d(17) \| P(1) \| N(2) |

FIG.34

| | OPERATION | SUPPLEMENT |
|---|---|---|
| LOAD AND STORE OPERATION | LOAD AND STORE ARE EXECUTED ON THE ASSUMPTION THAT I1, I2, SIZE, F, IT FIELDS ARE S1, S2, SIZE, F, T FIELDS OF THE BASIC INSTRUCTIONS. | L=1···LOAD<br>L=0···STORE<br>F=1···FR, F=0···R |
| INTEGER OPERATION | WHEN J≠"1111", AN OPERATION POINTED BY J FIELD IS EXECUTED FOR R(J1) AND R(J2) AND STORED IN R(JT) | J FIELD<br>0000 ADD, 0001 SUB<br>0010 AND, |
| FIRST FLOATING POINT OPERATION | FR(M1)×FR(M2)⟶FR(MT) | |
| SECOND FLOATING POINT OPERATION | AN OPERATION INDICATED BY AN A FIELD IS PERFORMED FOR FR(A1) AND FR(A2) AND IS STORED IN FR(AT). | A FIELD<br>CODE / MEANING<br>0 0 / FADD<br>0 1 / FSUB |
| THIRD FLOATING POINT OPERATION | FR(N1)×FR(N2)⟶FR(NT) | |
| FOURTH FLOATING POINT OPERATION | AN OPERATION POINTED BY A B FIELD IS PERFORMED FOR FR(B1) AND FR(B2) AND IS STORED IN FR(BT). | B FIELD IS THE SAME AS THE A FIELD. |
| FLOW CONTROL | THE RESULT OF THE INTEGER OPERATION INSTURCITON IS DETERMINED ACCORDING TO THE CC FIELD. IF THE CONDITION IS MET. | N FIELD<br>CODE / MEANING<br>0 0 / 0: NOP INSERT<br>0 1 / 1: NOP INSERT<br>1 0 / 2: NOP INSERT<br>1 1 / 3: NOP INSERT |

FIG.36

| 1 1 | 5 | 5 | 5 | 5 | 5 | 5 |
|---|---|---|---|---|---|---|
| 1 | I1 | I2 | IT | J1 | J2 | JT |

| 5 | 5 | 5 | 2 | 5 | 5 | 5 |
|---|---|---|---|---|---|---|
| M1 | M2 | MT | A | A1 | A2 | AT |

| 5 | 5 | 5 | 2 | 5 | 5 | 5 |
|---|---|---|---|---|---|---|
| N1 | N2 | NT | B | B1 | B2 | BT |

| 4 | 4 | 4 | 4 | 4 | 10 | 2 |
|---|---|---|---|---|---|---|
| ISZ | I | JSZ | J | CC | d | N |

FIG.37

| FIELD | OPERATION | SUPPLEMENT | |
|---|---|---|---|
| FIRST INTEGER OPERATION I1, I2, IT, ISZ, I | R(I1) AND R(I2) ARE PERFORMED AND THE RESULT IS STORED IN R(IT). | | |
| SECOND INTEGER OPERATION J1, J2, JT, JSZ, J | R(J1) AND R(J2) ARE PERFORMED AND THE RESULT IS STORED IN R(JT). | I, J | MEANING |
| | | 0000 | LOAD |
| | | 0001 | STORE |
| | | 0010 | PREFETCH |
| FIRST FLOATING POINT OPERATION M1, M2, MT | FR(M1)×FR(M2) → FR(MT) | 0011 | ADD |
| | | 0100 | SUB |
| | | ⋮ | ⋮ |
| SECOND FLOATING POINT OPERATION A1, A2, AT, A | FR(A1) AND FR(A2) ARE PERFORMED AND THE RESULT IS STORED IN FR(AT). | ISZ, JSZ | MEANING |
| | | 0000 | ONE WORDS |
| THIRD FLOATING POINT OPERATION N1, N2, NT | FR(N1)×FR(N2) → FR(NT) | ⋮ 0111 | ⋮ 256 WORDS } INTEGER |
| FOURTH FLOATING POINT OPERATION B1, B2, BT, B | FR(B1) AND FR(B2) ARE PERFORMED AND THE RESULT IS STORED IN FR(BT). | 1000 ⋮ 1111 | ONE WORDS ⋮ 256 WORDS } FLOATING POINT |
| FLOW CONTROL CC, d | THE RESULT OF THE INTEGER OPERATION INSTRUCTION IS DETERMINED ACCORDING TO THE CC FIELD. IF THE CONDITION IS MET, THE FLOW IS BRANCHED TO PC+d. | A, B | MEANING |
| | | 0 0 | FADD |
| NOP CONTROL N | N NOPS ARE INSERTED | 0 1 | FSUB |

FIG.38

| | | A(1) | A(2) | | |
|---|---|---|---|---|---|
| INSTRUCTION 4 | L { | A(3) | A(4) | } S | INSTRUCTION 11 |
| INSTRUCTION 6 | L { | A(5) | A(6) | } S | INSTRUCTION 13 |
| | | A(7) | A(8) | | |
| INSTRUCTION 8 | L { | A(9) | A(10) | } S | INSTRUCTION 15 |
| | | A(11) | A(12) | | |
| INSTRUCTION 10 | L { | A(13) | A(14) | } S | INSTRUCTION 17 |
| | | A(15) | A(16) | | |
| INSTRUCTION 12 | L { | A(17) | A(18) | } S | INSTRUCTION 19 |
| | | A(19) | A(20) | | |
| INSTRUCTION 14 | L { | A(21) | A(22) | } S | INSTRUCTION 21 |
| | | A(23) | A(24) | | |

| | | B(1) | B(2) |
|---|---|---|---|
| INSTRUCTION 1 | L { | B(3) | B(4) |
| INSTRUCTION 3 | L { | B(5) | B(6) |
| | | B(7) | B(8) |
| INSTRUCTION 5 | L { | B(9) | B(10) |
| | | B(11) | B(12) |
| INSTRUCTION 7 | L { | B(13) | B(14) |
| | | B(15) | B(16) |
| INSTRUCTION 9 | L { | B(17) | B(18) |
| | | B(19) | B(20) |
| INSTRUCTION 11 | L { | B(21) | B(22) |
| | | B(23) | B(24) |

FIG.40

| | FIRST INTEGER OPERATION ○:LOAD TO FR0 TO 3 △:LOAD TO FR0 TO 7 X: NOTHING | SECOND INTEGER OPERATION ○:STORE FR12 TO 15 X: NOTHING | FIRST FLOATING POINT OPERATION ○:FR0XFR31→FR8 △:FR2XFR31→FR10 X: NOTHING | SECOND FLOATING POINT OPERATION ○:FR4+FR8 →FR12 △:FR6+FR10→FR14 X: NOTHING | THIRD FLOATING POINT OPERATION ○:FR1XFR31→FR9 △:FR3XFR31→FR11 X: NOTHING | FOURTH FLOATING POINT OPERATION ○:FR5+FR9 →FR13 △:FR7+FR11→FR15 X: NOTHING | FLOW CONTROL X: CONSTANTLY UNSET |
|---|---|---|---|---|---|---|---|
| INSTRUCTION 1 | ○ | X | X | X | X | X | X |
| INSTRUCTION 2 | X | X | X | X | X | X | X |
| INSTRUCTION 3 | ○ | X | X | X | X | X | X |
| INSTRUCTION 4 | △ | X | ○ | X | X | X | X |
| INSTRUCTION 5 | ○ | X | △ | X | X | X | X |
| INSTRUCTION 6 | △ | X | ○ | X | ○ | X | X |
| INSTRUCTION 7 | ○ | X | △ | X | △ | X | X |
| INSTRUCTION 8 | △ | X | ○ | ○ | ○ | X | X |
| INSTRUCTION 9 | ○ | X | △ | △ | △ | X | X |
| INSTRUCTION 10 | △ | X | ○ | ○ | ○ | ○ | X |
| INSTRUCTION 11 | ○ | S | △ | △ | △ | △ | X |
| INSTRUCTION 12 | X | X | △ | ○ | ○ | ○ | X |
| INSTRUCTION 13 | △ | S | ○ | △ | △ | △ | X |
| INSTRUCTION 14 | △ | X | ○ | ○ | ○ | ○ | X |
| INSTRUCTION 15 | X | S | X | △ | △ | △ | X |
| INSTRUCTION 16 | X | X | X | ○ | X | ○ | X |
| INSTRUCTION 17 | X | S | X | X | X | △ | X |
| INSTRUCTION 18 | X | X | X | X | X | ○ | X |
| INSTRUCTION 19 | X | S | X | X | X | △ | X |
| INSTRUCTION 20 | X | X | X | X | X | X | X |
| INSTRUCTION 21 | X | S | X | X | X | X | X |

COMPUTER HAVING A PARALLEL OPERATING CAPABILITY

This application is a continuation application of Ser. No. 08/000,877, filed Jan. 5, 1993 now abandoned.

BACKGROUND OF THE INVENTION

The present invention relates to a computer which is capable of executing a parallel operation, and more particularly to the computer having a parallel operating function by means of a super scalar system and a VLIW system arranged in a mingling manner.

Computer architecture has progressed year to year with the aid in progress of semiconductor technology. In the nineteen eighties, in place of a CISC (Complex Instruction Set Computer) for processing a complicated instruction by using micro instructions over a plurality of cycles, a RISC (Reduced Instruction Set Computer) has emerged for executing a simple instruction for one cycle.

As a higher operating technique, a super scalar system and a VLIW (Very Long Instruction Word) system have been proposed.

The super scalar system is a system for detecting a competition or conflict between instructions by hardware when executing an instruction and executing a plurality of instructions over one machine cycle if no competition is detected. This system has been described in the Japanese Patent Application No. 63-283673 (prior art 1) or J-Hennessy and D. A. Patterson "Computer Architecture A Quantitative Approach" Morgan Kantmann Publishers, Inc. 1990.P.318 (prior art 2).

The VLIW system is a system arranged to use a long instruction having a field for controlling an operation of two or more operating units. Though the normal RISC processor has an instruction length of 32 bits, the VLIW system has an instruction length of 64, 128, 256 or more bits. This system has been described in the aforementioned J-Hennessy and D. A. Patterson (prior art 2).

As an improvement of the VLIW system, a technique has been proposed where a one-word instruction and a three-word instruction are processed by the VLIW system in a mingling manner. This technique thus can improve a code size. The technique is described in Robert Cohn et al. "Architecture and Compiler Tradeoffs a Long Instruction Word Microprocessor" Third International Conference on Architectural Support for Programming Languages and Operating Systems, 1989, p. 2–14 (prior art 3).

Hereafter, the features of the super scalar system and the VLIS system will be described.

The super scalar system has a feature of reducing a code size because the system indicates only an effective operation by the short length instruction for indicating a simple operation.

Further, since no additional instruction is necessary, the super scalar system can keep compatibility between the new and the previous models.

On the other hand, the first shortcoming of the super scalar system is that it is necessary to detect a competition among operations to be executed in parallel. As the operations to be executed in parallel increase in number, the necessary amount of hardware for detecting the competition is made larger.

The second shortcoming of this system is that a complicated check for competition and queuing are required between an instruction executed before the current cycle and an instruction to be executed at the current cycle. As the operations to be executed in parallel increase in number, more instructions are made competitive to the instruction of the current cycle. The hardware for detecting the competition and queuing between both, regarded as the second shortcoming, is made more complicated.

The third shortcoming of the super scalar system is that the registers to be specified by an instruction are fewer, because the instruction length is short. A typical number of registers is 16 to 32. As described in J-Hennessy and D. A. Patterson, p. 325, it is possible to use a loop unrolling or a software pipeline as a device on software for increasing the operations to be executed in parallel. However, the number of the registers is not sufficient to this device. In other words, the optimization is not allowed in the range of the existing registers.

As a remedy, the prior art 1 has described in E-21 to 22 a device for inhibiting immediate reflection (use) of an operated result in the next instruction for improving insufficiency of the registers.

It has been described that a super scalar machine can prefetch data from a main memory to a cache memory by using an instruction in the writing of David Callahan et al. "Software Prefetching" Fourth International Conference on Architecture Support for Programming Language and Operating System, 1991, p.40 to 52.

As described above, the super scalar system has an obstacle to enhancing a machine cycle if the instructions to be executed in parallel are increased in number, because of the first and the second shortcomings, that is, the complicated check for competition. Hence, this system is not capable of enhancing a processing speed to any great extent.

Turning to the VLIW system, this system has a first feature of specifying a plurality of operations in a single instruction because the instruction length is long and eliminating the necessity of checking for competition among operations to be executed in parallel by hardware when executing the instructions.

As a second feature, the VLIW system enables the specifying of more registers because the word length is long.

The VLIW system has a first shortcoming that it cannot necessarily specify an effective operation to all the fields and thus needs a larger code size.

As a second shortcoming, the system provides a complicated check for competition and queuing between an instruction executed before the current cycle and an instruction to be executed at the current cycle. This is the same as the second shortcoming of the super scalar system.

To overcome this shortcoming, a technique for pre-avoiding a competition by a compiler without having to use hardware for detecting a competition has been described in Andrew Wolf and John P. Shen "A Variable Instruction Stream Extension to the VLIW Architecture", Fourth International Conference on Architecture Support for Programming Languages and Operating System, 1991, p. 2 to 14.

As a third shortcoming, the VLIS system does not allow for compatibility with previous models. This is because the super scalar system can execute the conventional one-word instruction by hardware, while the VLIW system needs to redefine the instruction.

As described above, no computer has been proposed for compensating for the shortcomings of the super scalar system and the VLIW system while keeping advantageous the features of those systems.

SUMMARY OF THE INVENTION

It is an object of the present invention to provide a computer which is capable of executing an operation with the super scalar system and the VLIW system being in a mingling manner. Another object of the present invention is to provide a computer having a faster processing speed while maintaining upward compatibility with a computer having the conventional architecture which use a shorter instruction for indicating a single operation.

In carrying out the objects, according to a first aspect of the invention, the computer is arranged to have a register, a memory and a program counter and provide a parallel operating function of reading an instruction stored in the memory and indicated by the program counter and a capability of executing the operation indicated by the instruction with respect to the register. The memory and the program counter, the instruction may be a short-length instruction for indicating a single operation and a long-length instruction for indicating a plurality of operations. The invention further includes means for determining if the instruction indicated by the program counter is a short-length instruction or a long-length instruction, and means for setting the instruction in the register if the instruction is determined to be a long-length instruction and for setting the instruction to a predetermined register if the instruction is determined to be a short-length instruction.

According to a second aspect of the invention, the computer is arranged to provide a register, a memory, a program counter and read an instruction indicated by the program counter and stored in the memory and provide a capability of executing the operation indicated by the instruction with respect to the register, the memory and the program counter. The instruction may be a short-length instruction for indicating a single operation or a long-length instruction for indicating a plurality of operations. The invention further includes means for determining if the instruction indicated by the program counter is the short-length instruction for indicating a single operation or the long-length instruction for indicating a plurality of operations, means for detecting a competition among the short-length instructions, and means for setting the instruction to the register if the instruction is determined to be the longer one by the word length determining means or setting the instruction to a predetermined register if the instruction is determined to be the shorter one by the word length determining means and no competition is checked out by the competition checking means.

According to a third aspect of the invention, the computer is arranged to have a register, a memory and a program counter, read an instruction indicated by the program counter from the memory and provide a capability of executing an operation indicated by the instruction with respect to the register, the memory and the program counter. The instruction may be a short-length instruction for indicating a single operation or a long-length instruction for indicating a plurality of operations. The invention further includes means for determining if the instruction indicated by the program counter is the short-length instruction or the long-length instruction, means for detecting a competition among the short-length instructions if the instruction is determined to be the short-length instruction, and means for executing a predetermined number of short-length instructions for one machine cycle according to the content of the competition detecting means if the instruction is determined to the short-length instruction or executing a predetermined number of long-length instructions for one machine cycle if the instruction is determined to be the long-length instruction.

According to the invention, the computer is capable of executing two or more short-length instructions each for indicating a single operation for one machine cycle or executing one long-length instruction for indicating a plurality of operations in parallel for enhancing the performance of the computer itself.

According to the invention, the computer uses the long-length instruction only when the operations to be executed in parallel are made more so as to eliminate a no-operation field in the long-length instruction and thereby reducing the code size. This results in enhancing the efficiency of use of the main memory and the cache memory, thereby improving the processing speed.

According to an embodiment of the invention, no competition exists among a plurality of operations indicated by the long-length instruction. Hence, it is not necessary to detect the competition by hardware. What is needed for the hardware is to detect only the competition among the short-length instructions executed for the same cycle. According to the invention, the number of short-length instructions executed for one machine cycle can be set to be smaller than the number of operations indicated by the long-length instruction for more easily detecting a competition among operations to be executed in parallel through the number of operations executed for one machine cycle is high as the average.

According to another embodiment of the invention, the computer is capable of generating an instruction train by a compiler in a manner to avoid competition between the long-length instruction and the previous one. Hence, there is no necessity for detecting the competition by hardware.

According to another embodiment of the invention, when executing an effective long-length instruction after executing an effective short-length instruction and when executing an effective short-length instruction after executing an effective long-length instruction, by inserting as many nullifying instructions as required between both of the instructions, the competition between them can be solved on the software. The hardware just needs to detect the competition between the short-length instruction executed before the current cycle and the long-length instruction to be executed at the current cycle. According to the invention, therefore, by making the number of the short-length instructions executed for one machine cycle smaller the number of the operations indicated in the long-length instruction, the detection of the competition between the instructions executed before the current cycle and the instruction executed at the current cycle is made easier as the number of operations executed for one machine cycle on the average is made higher though the number of operations executed for one machine cycle is high on the average.

According to another embodiment of the invention, the operated result indicated by the instruction is reflected on the instruction later than the next instruction by some without having to immediately reflect the operated result on the next instruction. After executing the instruction, the instruction to be executed until the result is reflected serves to read a value of the register before writing a value therein. Hence, the number of the registers treated by the software is made substantially larger so as to implement the optimization of the software for enhancing the number of the parallel operations.

According to another embodiment of the invention, the hardware for detecting the competition is made so simple that the machine cycle may be improved for enhancing the processing speed.

According to another embodiment of the invention, the long-length instruction for indicating a plurality of operations is added to the short-length instruction having the conventional architecture for indicating a single operation for forming a new architecture. The upward compatibility is allowed to be maintained, because the new architecture is arranged to have the conventional architecture.

These and other objects, feature and advantages of the present invention will be understood more clearly from the following detailed description with reference to the accompanying drawings, wherein:

BRIEF DESCRIPTION OF THE DRAWINGS

FIG. 3 is a table for explaining an instruction format;

FIG. 4 is a table for explaining an operation of a one-word instruction;

FIG. 5 is a table for explaining an operation of a four-word instruction;

FIG. 10 is a view showing a data disposition on memory;

FIG. 12 is a table for explaining a program using a four-word instruction;

FIG. 20 is a view for explaining an operation of a shadow register;

FIG. 21 is a view for explaining an operation of the shadow register;

FIG. 22 is a view for explaining an operation of the shadow register;

FIG. 23 is a table for explaining an operation of a mode control circuit;

FIG. 24 is a table for explaining an operation of a readout control circuit for the register;

FIG. 29 is a view showing pipelines arranged when a cache miss takes place in the load store operation;

FIG. 31 is a view showing the embodiment shown in FIG. 30;

FIG. 32 is a view showing the embodiment shown in FIG. 30;

FIG. 33 is a view showing the embodiment shown in FIG. 30;

FIG. 34 is a view showing the embodiment shown in FIG. 30;

FIG. 36 is a view showing the embodiment shown in FIG. 30;

FIG. 37 is a view showing the embodiment shown in FIG. 30;

FIG. 38 is a view showing the embodiment shown in FIG. 30;

FIG. 40 is a view showing the embodiment shown in FIG. 30; and

DESCRIPTION OF THE PREFERRED EMBODIMENT

Hereafter, the description will be directed to a preferred embodiment of the invention. In the following description, the relevant detail to the essence of the invention is left out.

Figure 1:
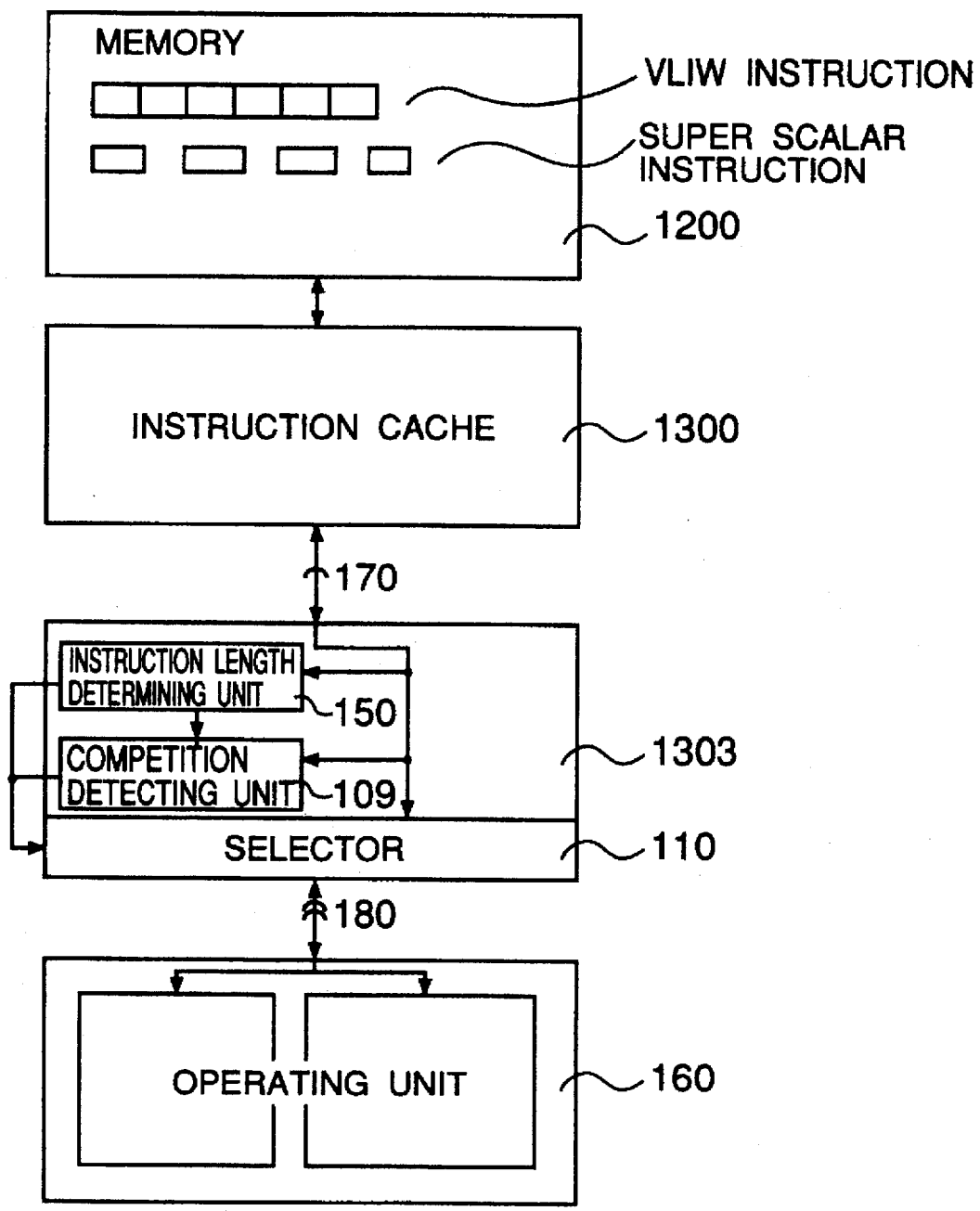
FIG. 1 is an overall diagram showing an instruction control unit.

FIG. 1 is a block diagram showing the overall computer according to the embodiment of the invention. As shown, a numeral 1200 denotes a memory. A numeral 1300 denotes an instruction cache. A numeral 1303 denotes an instruction control unit. A numeral 160 denotes an operating unit. A numeral 150 denotes an instruction length determining section. A numeral 109 denotes a competition detector. The instruction control unit 1303 reads an instruction from the instruction cache through an interface 170 and decodes it for controlling the operating unit 160 through the interface 180. The operating unit 160 can process a plurality of operations in parallel. The computer according to this invention can execute a four-byte instruction for indicating a single operation and a 16-byte instruction for indicating a plurality of operations. In the instruction cache 1300, the 16-byte instructions and the four-byte instructions are stored in a mingling manner so as to avoid a competition between the 16-byte instructions and the four-byte instructions. The competition detector 109 serves to detect a competition only among the four-byte instructions. The instruction control unit 1303 is provided with the instruction length determining section 150 and a selector 110 so that the selector 110 can ignore an output of the competition detector 109 when executing the 16-byte instruction or select an operation to be executed in parallel according to an output of the competition detector 109 when executing the four-byte word. The selector 110 decodes the selected operation and controls the operating unit 160 through the interface 180. In the illustrative embodiment, two operating units are provided. It goes without saying that they may be two or more.

Next, the description will be oriented to the register arrangement and the instruction format, the pipelines and the operating timing. Finally, the detail of the overall arrangement shown in FIG. 1 will be discussed.

Figure 2:
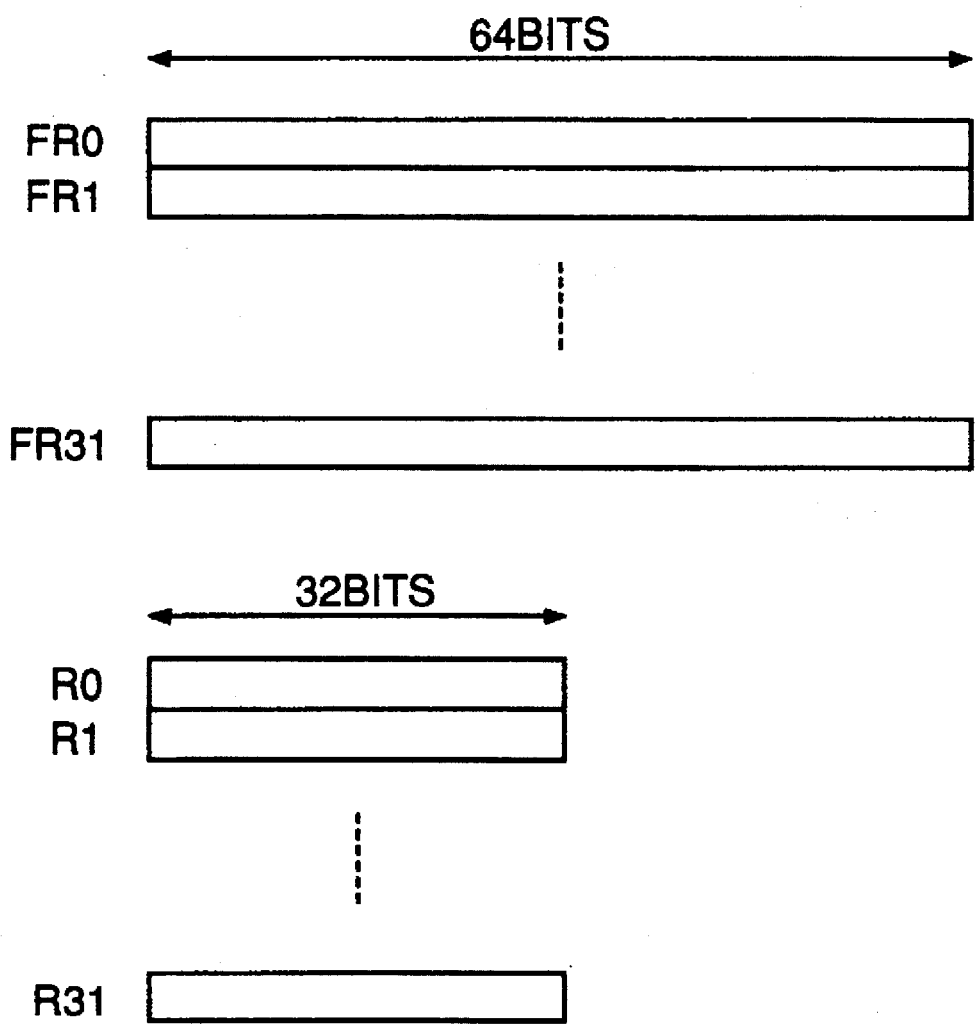
FIG. 2 is a view showing a register composition.

FIG. 2 shows the register arrangement. FR0 to FR31 denote floating point registers having a 64-bit length. R0 to R31 denote integer registers having a 32-bit length. For simplifying the description, the floating point data is assumed to be a 64-bit length at a double accuracy. An address is swung at each 32 bits.

In the illustrative embodiment, the short word has a one-word length and the long word has a four-word length.

FIG. 3 shows an instruction format. One word consists of 32 bits. A basic instruction, a branch instruction, and a load and store instruction are one-word instructions. A compound instruction is a four word instruction. The basic instruction is an operation done between the registers. Though the long-length instruction is set to have a four-byte length, it may be longer or shorter.

In this embodiment, for simplifying the description, it is assumed that the four-word instruction is located at consecutive four words delimited by a four-word border. This assumption can be easily changed.

At first, the basic instruction will be described. As shown in FIG. 3, an OP field denotes a type of an operation code. S1 and S2 fields denote numbers of two source registers, respectively. A T field denotes a number of a target register. A CC field denotes a field indicating how a flag is set. That is, an operation denoted by the OP is performed with respect to the registers shown by S1 and S2, so that the result is written in the register denoted by T. The detail will be shown in FIG. 4.

Next, the branch instruction will be described. d denotes a displacement. In the branch instruction, a value of d is added to the program counter PC.

Next, the load and store instruction will be described. An F field indicates if the data to be loaded or stored is floating point data or integer data. A SIZE field indicates a word length of data to be loaded or stored as shown in FIG. 4. For the integer data, only one word is defined. For the floating point data, two to sixteen words are defined. As shown in FIG. 4, for an FST instruction, FR(S1) is written at the R(S2) address. If the SIZE field indicates sixteen words, FR(S1) to FR(S1+7) are written at consecutive sixteen words starting from the R(S2) address. For an FLD instruction, the data at R(S1)+R(S2) addresses are written in FR(T). If the SIZE field indicates sixteen words, the consecutive sixteen words starting from the R(S1)+R(S2) are written in FR(T) to FR(T+7).

Next, the four-word compound instruction will be described as referring to FIGS. 3 and 5. This instruction has a function of indicating seven operations: a load and store operation indicated by the I1, I2, IT, SIZE, F fields, an integer operation indicated by the J1, J2, JT and J fields, a first floating point operation indicated by the M1, M2 and MT fields, a second floating point operation indicated by the A1, A2, AT and A fields, a third floating point operation indicated by the N1, N2 and NT fields, a fourth floating point operation indicated by the B1, B2, BT and B fields, and a flow control indicated by the CC, d and N fields. The detail of each field will be shown in FIG. 5. The first and the third floating point operations are a multiplication and the second and the fourth floating point operations are an addition or subtraction. The N field denotes the number of no-operation cycles to be inserted after this instruction. The way of using it will be described later.

The integer operation will be described. When J field≠1111, a normal operation is performed as shown in FIG. 5. When J field≠1111, the data is prefetched from the memory to the cache memory. That is, the operation is executed to access the cache memory with the addresses as R(J1)+R(J2) and transfer data from the memory to the cache memory if the necessary data cannot be found out.

For the one-word instruction, the operated result is immediately reflected on (used in) the next instruction. For the four-word instruction, the operated result is reflected on (used in) the third instruction. The description will be oriented to the pipeline arrangement and the program which allow this specification to be used.

Figure 6:
FIG. 6 is a view for explaining pipeline stages.

As shown in FIG. 6, the pipeline arrangement has five stages of IF, D, E, F and S. At the IF stage, an instruction is read. At the D stage, an instruction is decoded. At an E stage, the read from a register and a partial operation are carried out. At an F stage, an operation is performed. At an S stage, the remaining operation and the write of an operation to the register are carried out. The pipeline arrangement holds true to the integer operation and the floating point operation.

Figure 7:
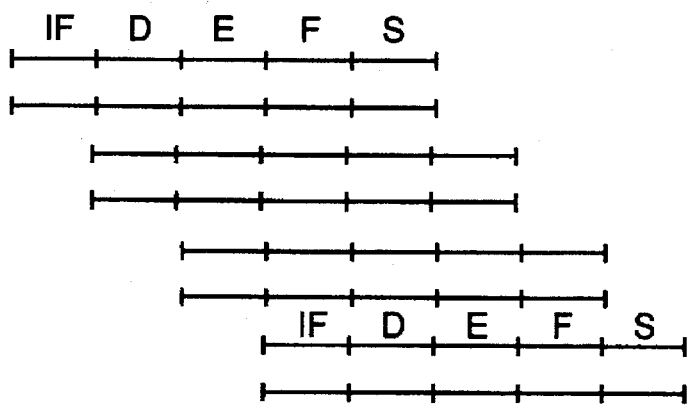
FIG. 7 is a view showing pipelines for processing a one-word instruction when no competition takes place.

FIG. 7 shows a flow for processing a one-word instruction according to this embodiment. This is a super scalar system for processing two instructions for one machine cycle. The instructions 1 and 2, 3 and 4, 5 and 6, and 7 and 8 are processed in parallel unless any competition is detected. This super scalar system is discussed in detail in the Japanese Patent Application No. 63-283673.

Figure 8:
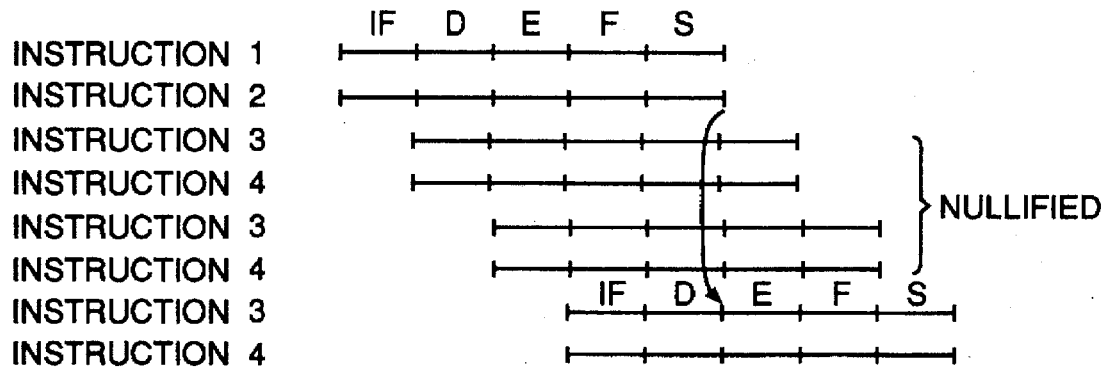
FIG. 8 is a view showing pipelines for processing a one-word instruction when a competition takes place.

In turn, FIG. 8 shows how the instruction 3 treats the operated result of the instruction 2. The E stages of the instructions 3 and 4 are extended until the S stage of the instruction 2 is terminated. In order to meet the instruction specification of reflecting the operated result of the previous instruction on the current instruction, the competition is detected by hardware for performing the operation shown in FIG. 8.

Figure 9:
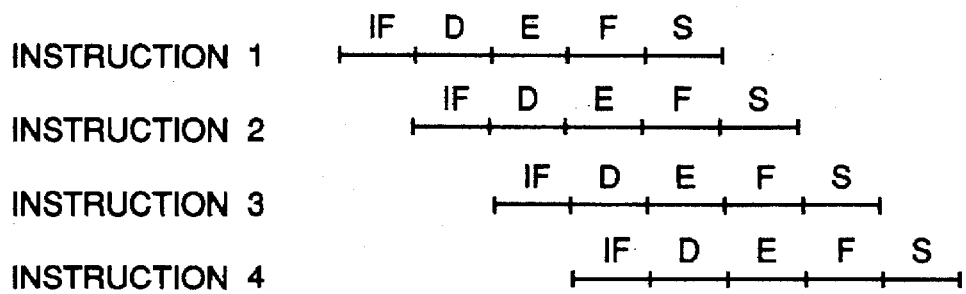
FIG. 9 is a view showing pipelines for processing a four-word instruction.

FIG. 9 shows how the four-word instruction is processed. The four-word instruction is processed one for one machine cycle. The operated result of the instruction 1 is not reflected on (not used in) the instructions 2 and 3 but on the instruction 4 according to the foregoing specification. The S stage where the instruction 1 is written to the register has been terminated one before the D stage where the instruction 4 is read from the register. Hence, it is unnecessary to control the competition by hardware as described with respect to FIG. 8. According to this embodiment, the operating stages are three of E, F and S. In general, if the number N of instructions to be executed before writing an operated result and the number M of the pipelines meet the relation of N≧M−1, it is not necessary to control the competition by hardware. This embodiment has concerned with the case where N=2 and M=3 are given.

It is necessary to place two no-operation four-word instructions between a one-word instruction and the next effective four-word instruction. Likewise, it is also necessary to place two no-operation four-word instructions between the effective four-word instruction and the next one-word instruction.

Next, the preferable program for processing this four-word instruction will be described as referring to FIGS. 10, 11 and 12. Consider that the following calculation is to be performed.

$$A(i)=A(i)+C \times B(i), 1 \leq i \leq 24$$

where C denotes a constant and A(i) and B(i) denote 64-bit floating point data located on the memory as shown in FIG. 10.

Figure 11:
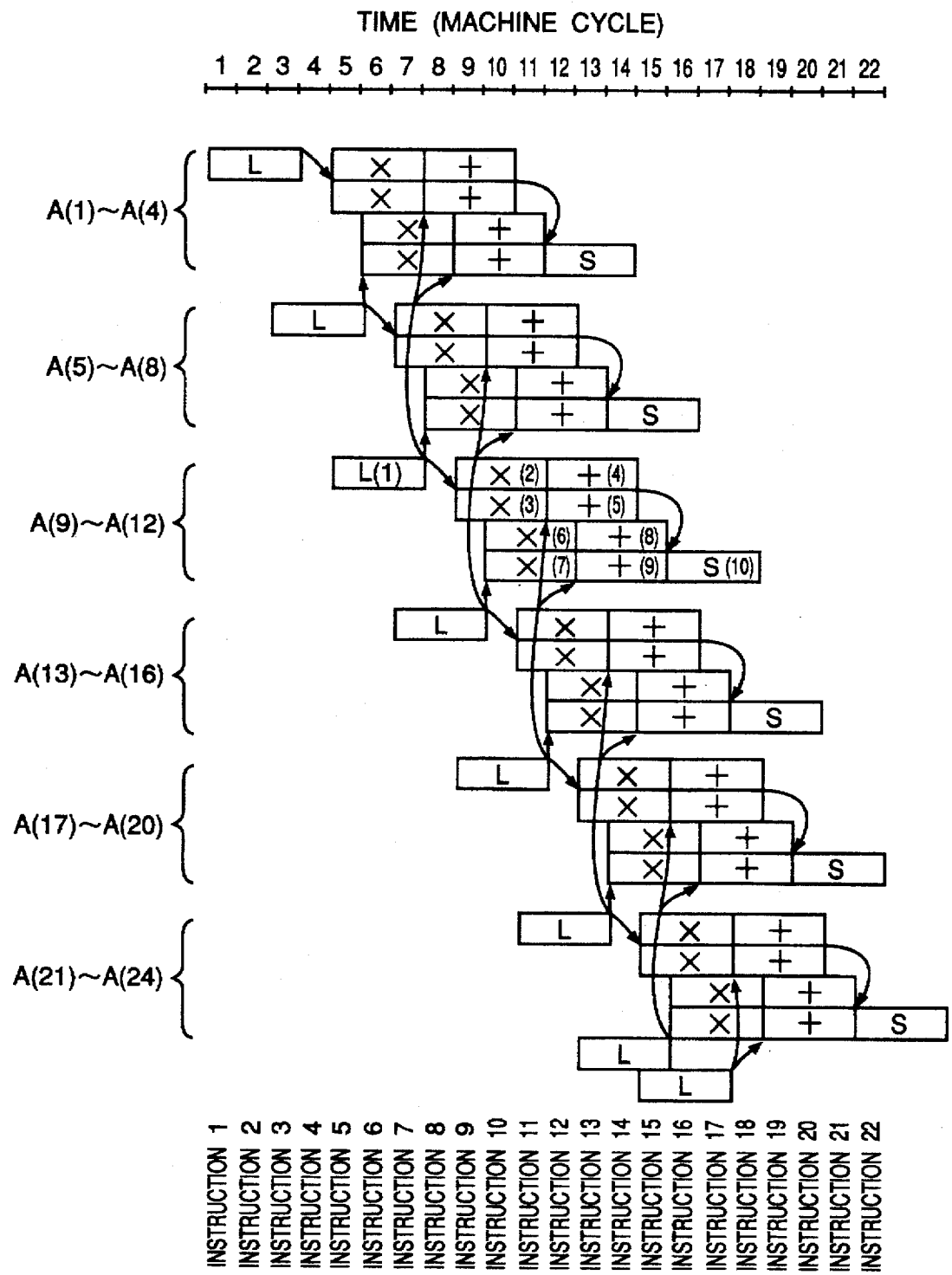
FIG. 11 is a view for explaining how a four-word instruction is operated.

FIG. 11 is a view for explaining what type of operation is done for each cycle for calculating A(i). In FIG. 11, an axis of abscissa denotes a time, the unit of which is a machine cycle. The shown elongate boxes indicate three stages of E, F and S of an operating unit through which the processed data passes. The following steps (1) to (10) will be described. Each of four operations is performed about an index i. Those steps (1) to (10) are for calculating A(9) to A(12). Hereafter, each processing step will be described. The constant C is assumed to be at the FR31.

(1) Load A(1) to A(4) to FR4 to FR7 and B(7) to B(10) to FR0 to FR3.

(2) Store FR0×FR31 in FR8.

(3) Store FR1×FR31 in FR9.

(4) Store FR4+FR8 in FR12.

(5) Store FR5+FR9 in FR13.

(6) Store FR2×FR31 in FR10.

(7) Store FR3×FR31 in FR11.

(8) Store FR6+FR10 in FR14.

(9) Store FR7+FR11 in FR15.

(10) Store FR12 to FR15 in A(9) to A(12).

About the operation scheduling of the steps (1) to (10), it is considered that three cycles need for performing one process as has been described with respect to FIG. 10. The description has concerned with the processes of A(9) to A(12), but the similar processing is performed about A(13) to A(16) and A(17) to A(20). Each operating unit is pipelined at one cycle pitch. The processes of A(13) to A(16) and A(16) to A(20) are overlapped with the processes of A(9) to A(12). Hence, the processing is allowed to be executed as shown in FIG. 1.

FIG. 12 shows a four-word instruction train for implementing the process shown in FIG. 11. The operations of A(1) to A(24) can be implemented by 22 instructions from the instructions 1 to 22 as shown in FIG. 12. The seventeen registers from FR0 to FR15 and FR31 are used. FIG. 10 shows which data is loaded by the instructions 1, 3, 5, 7, 11, 13 and 15 and which data is stored by the instructions 12, 14, 16, 18, 22 and 22. The instruction 3 is executed to write values in the FR0 to FR3 but the operated result is reflected on the instruction 6 or later. Hence, the values of the FR0 to FR3 loaded by the instruction 1 are allowed to be used by the instruction 4. If the conventional system for directly reflecting the operated result of the instruction 1 on the instruction 2 is used for performing the process as shown in FIG. 11, the instruction 3 cannot be executed to write values in the FR0 to FR3. It means that new registers such as FR16 to FR19 are required. However, the number of the used registers is limited. The critical number of the registers disadvantageously increases the processing cycles in number. The program shown in FIG. 12 needs only seventeen registers for implementing the operation, because the delay writing operation is executed to reflect the operation result of the current instruction on the fourth instruction from the current one.

The delay writing operation provides an effect of substantially increasing the number of usable registers without having to increase the fields of the operation code for specifying the registers.

In FIG. 12, a mark "X" indicates an empty field because there exists no data to be operated. Such empty fields are often found in the instructions 1 to 6 issued when starting the processing and the instructions 17 to 22 issued when terminating the processing. However, such empty fields are allowed to be decreased by overlapping a series of starting processes with the current series of terminating processes. Further, it is possible to remove the instructions 2, 4, 21 having nothing to execute by setting each N field of the instructions 1, 3 and 20 to "01".

According to the invention, another special instruction is used for specifying a register where the operated result is written. Hence, the instructions 4 and 21 are allowed to be removed. On the other hand, the system arranged to specify a register where the operated result is written in response to the instruction issued to the stage where the writing is done requires the instructions 4 and 21 to specify the registers where the operated results of the instructions 1 and 18 are written. It means that the instructions 4 and 21 are disallowed to be removed.

When a one-word instruction is issued before the program shown in FIG. 12, it is necessary to insert two four-word no-operation instructions before the instruction 1 shown in FIG. 12. In place, only one no-operation four-word instruction having an N field set to "01" is needed to be inserted. When a one-word instruction is issued after the program shown in FIG. 12, the N field of the instruction 22 shown in FIG. 12 is just set to "10".

By making the instruction longer and providing and making use of the N field, it is possible to reduce the code size. The one-word instruction has a function of indicating only four operations by four words, while the four-word instruction has a function of indicating seven operations by four words as shown in FIG. 5.

Next, how to create a program will be described. The program is described by a high-level language such as FORTRAN or C and then is transformed into an instruction train by a compiler.

Figure 26:
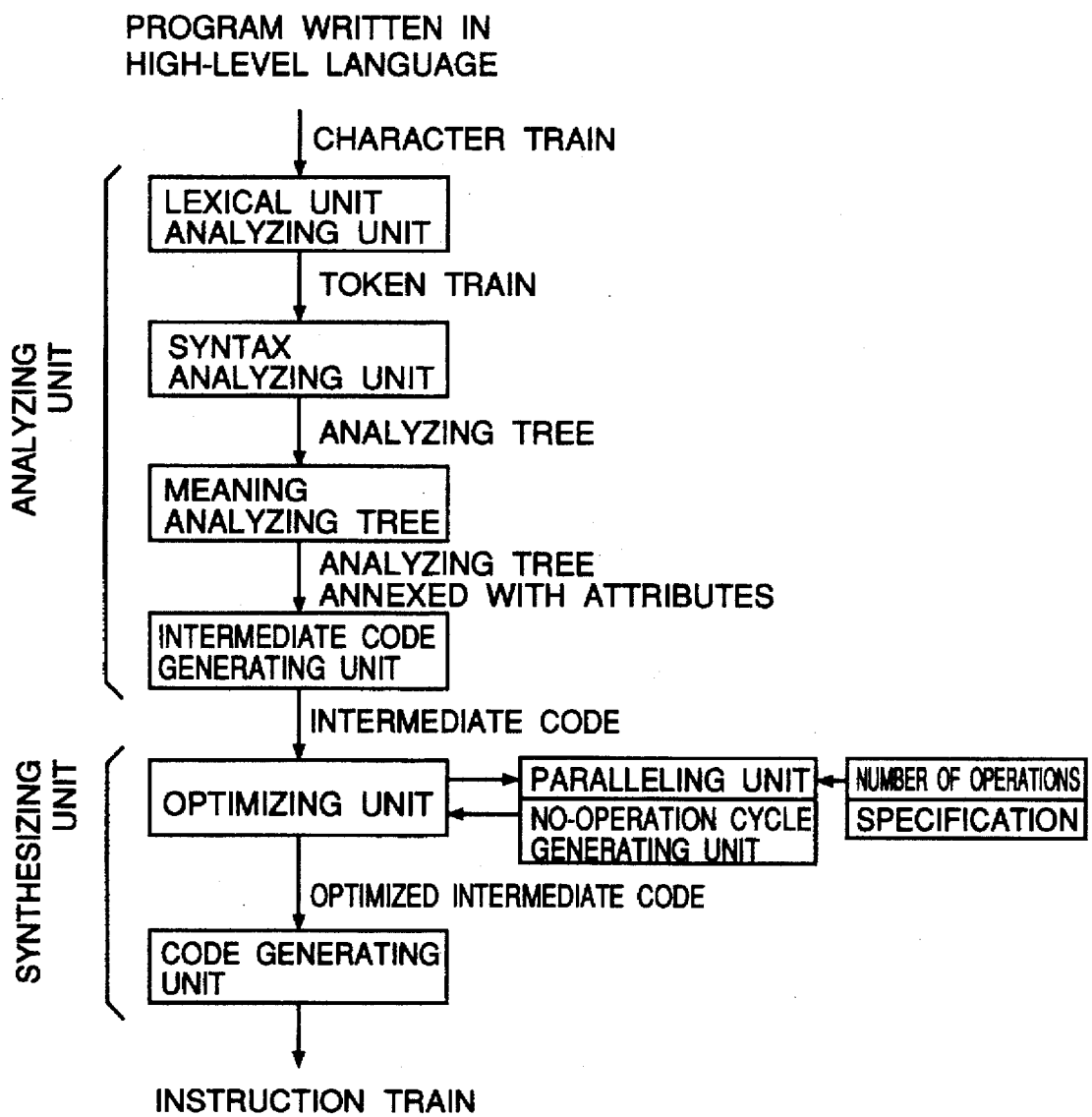
FIG. 26 is a flowchart showing a compiler.

FIG. 26 shows a processing flow of the compiler according to the invention. The program written by the high-level language is converted into an intermediate code through a lexical unit analyzing unit, a syntax analyzing unit, and a meaning analyzing unit. The intermediate code is optimized by an optimizing unit and then is converted into an instruction train as shown in FIG. 3 in a code generating unit. Both of the optimizing unit and the code generating unit compose a synthesizing unit on which the feature of this invention is placed. That is, this synthesizing unit provides a paralleling section for generating such an instruction train as making as many operations to be done in parallel as possible in light of the intermediate code. This paralleling section uses a four-word instruction if the number of operations to be executed in parallel is large or a one-word instruction if the number of such operations is small. Herein, the judging criterion as to if the used instruction is a four-word one or a one-word one is defined by the number of operations to be executed in parallel. The number of operations depend on the system. When creating a program, this number can be set as a parameter to the compiler. The arrangement as described above makes the code size smaller, the using efficiency of the main memory and the cache memory higher, and the processing speed faster.

In turn, the description will be oriented to another feature of the synthesizing unit, that is, allocation of the register. The four-word instruction needs to be considered, because the operated result is reflected on the fourth instruction from the current instruction. For example, since the operated result of the instruction 1 is reflected on the instruction 4 for the first time, it is economical to allocate to the instructions 2 and 3 as many operations as possible. At this time, when two or more single instructions are operated, a no-operation instruction generating unit serves to insert a no-operation instruction. The synthesizing unit is required to insert two no-operation four-word instructions between the effective four-word instruction and the next one-word instruction.

Conversely, it is necessary to insert two no-operation four-word instructions between the effective four-word instruction and the next one-word instruction. Herein, the no-operation instruction can be removed by setting the N field as mentioned above. That is, the compiler according to this embodiment serves to detect a competition between long instructions and specify the number of no-operation cycles to be inserted after executing an instruction by using the N field. Hence, the hardware is not required to detect or process a competition between long instructions.

Figure 13:
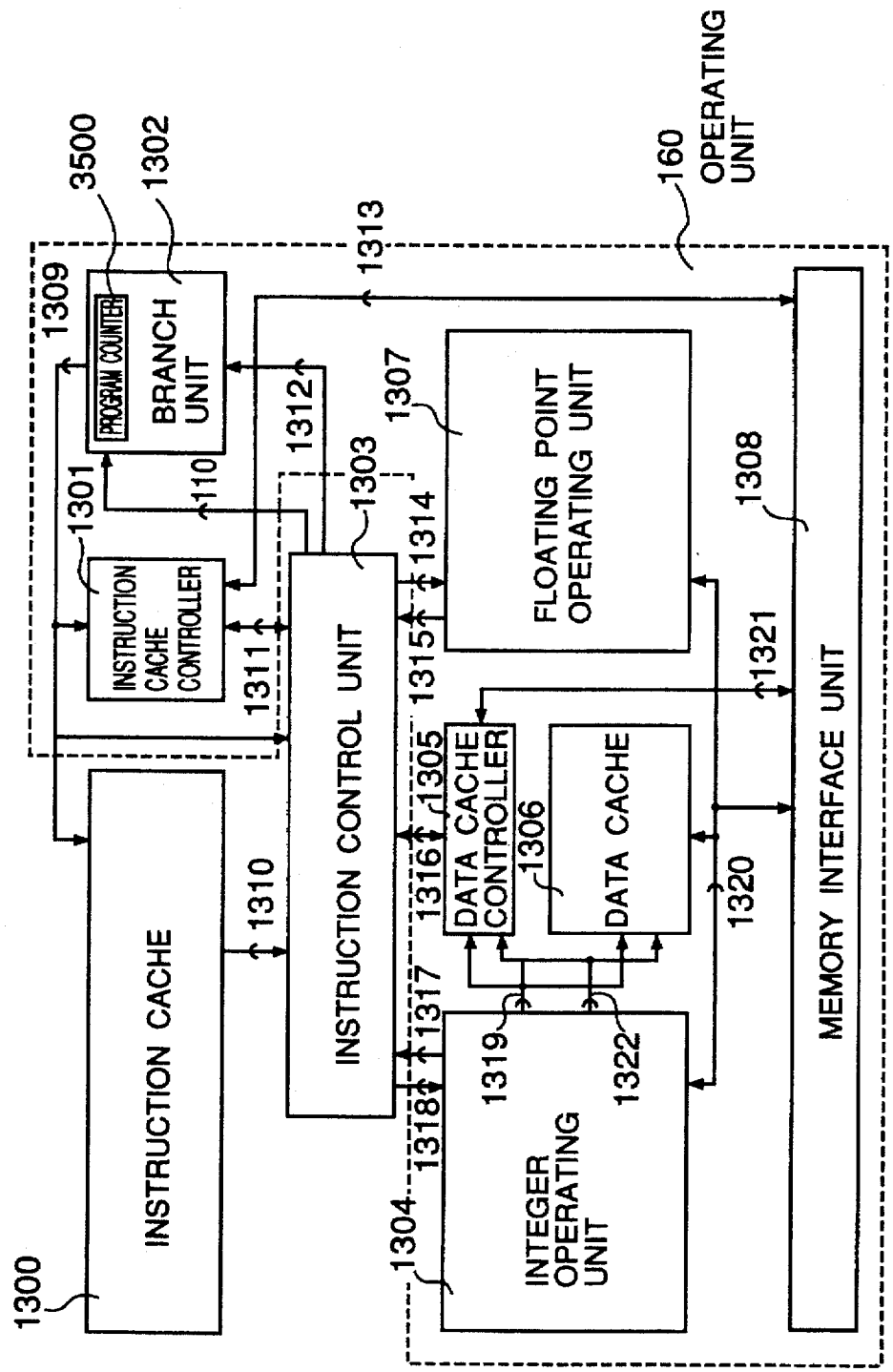
FIG. 13 is a block diagram showing an embodiment of an instruction control unit.

Next, the description will be oriented to a hardware for processing the instructions described above according to an embodiment of the invention. FIG. 13 shows the overall detailed arrangement of FIG. 1. A numeral 1300 denotes an instruction cache. A numeral 130 denotes an instruction cache controller. A numeral 1302 denotes a branch unit for controlling an instruction processing flow. A numeral 1303 denotes an instruction control unit for decoding an instruction. A numeral 1304 denotes an integer operating unit. A numeral 1307 denotes a floating point operating unit. A numeral 1306 denotes a data cache. A numeral 1305 denotes a data cache controller. A numeral 1308 denotes a memory interface unit.

The instruction control unit 1303 accepts an instruction to be executed by the instruction cache 1300 through a bus 1310 and decodes the instruction. Then, the unit 1303 serves to send a control signal 1318 for the integer operating unit to the integer operating unit 1304, a control signal 1314 for the floating point operating unit to the floating point operating unit 1307, a control signal 1312 for the branch unit to the branch unit 1302. Further, the unit 1303 serves to send out a mode signal 110 to the branch unit 1302 for controlling the program counter 3500. The unit 1303 accepts a flag 1317 from the integer operating unit 1304 and a flag 1315 from the floating point operating unit 1307.

The integer operating unit 1304 sends out an operand address 1319 to the data cache 1306 and the data cache controller 1305. The data read from the data cache is sent to the integer operating unit 1304 or the floating point operating unit 1307 through the data bus 1320. If no desired data is found in the data cache, the data cache controller 1305 issues an interface signal 1321 for starting the memory interface unit 1308 so that it may read data from the main memory. The controller 1305 controls the queuing for this operation together with the instruction control unit 1316 through the effect of the signal 1316.

The branch unit sends out an address 1309 of a next instruction to be read out to the instruction cache 1300 and the instruction cache controller 1301. If no desired instruction is found in the instruction cache 1300, the instruction cache controller 1301 issues an interface signal 1313 for starting the memory interface unit 1308 so that it may read a desired instruction from the main memory. The controller 1301 controls the queuing for this operation together with the instruction control unit 1316 through the effect of a signal 1311.

Figure 14:
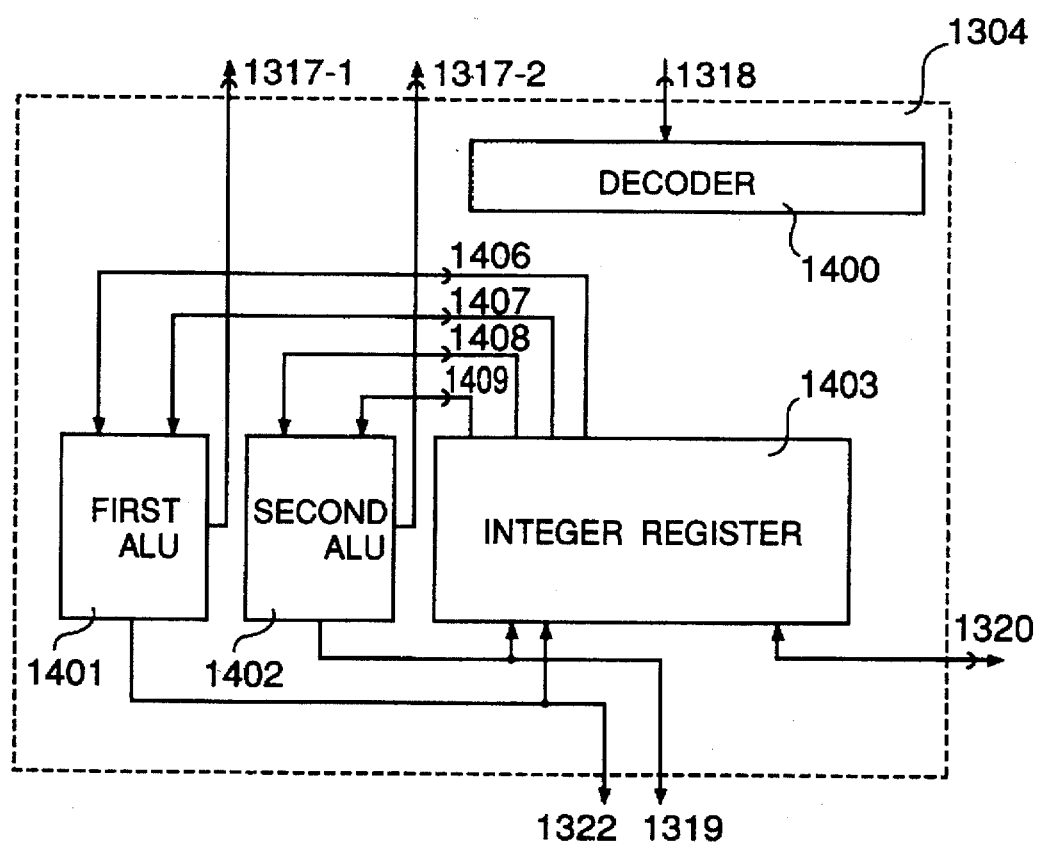
FIG. 14 is a block diagram showing an integer operating unit.

The detail of the integer operating unit 1304 is shown in FIG. 14. A numeral 1400 denotes a decoder. A numeral 1401 denotes a first ALU (Arithmetic and Logic Unit). A numeral 1402 denotes a second ALU. A numeral 1403 denotes an integer register. The first ALU accepts data from the integer register file 1403 through source buses 1406 and 1407 and gives back the operated result to the integer register file 1403 through a target bus 1322. The second ALU accepts data from the integer register file 1403 through source buses 1408 and 1409 and gives back the operated result to the integer register file 1403 through a target bus 1319. 1317-1 denotes a flag output from the first ALU. 1317-2 denotes a flag output from the second ALU. Numerals 1319 and 1322 denote buses which are led to the data cache 1306 as an address when executing a load and store and a prefetch operations.

Figure 15:
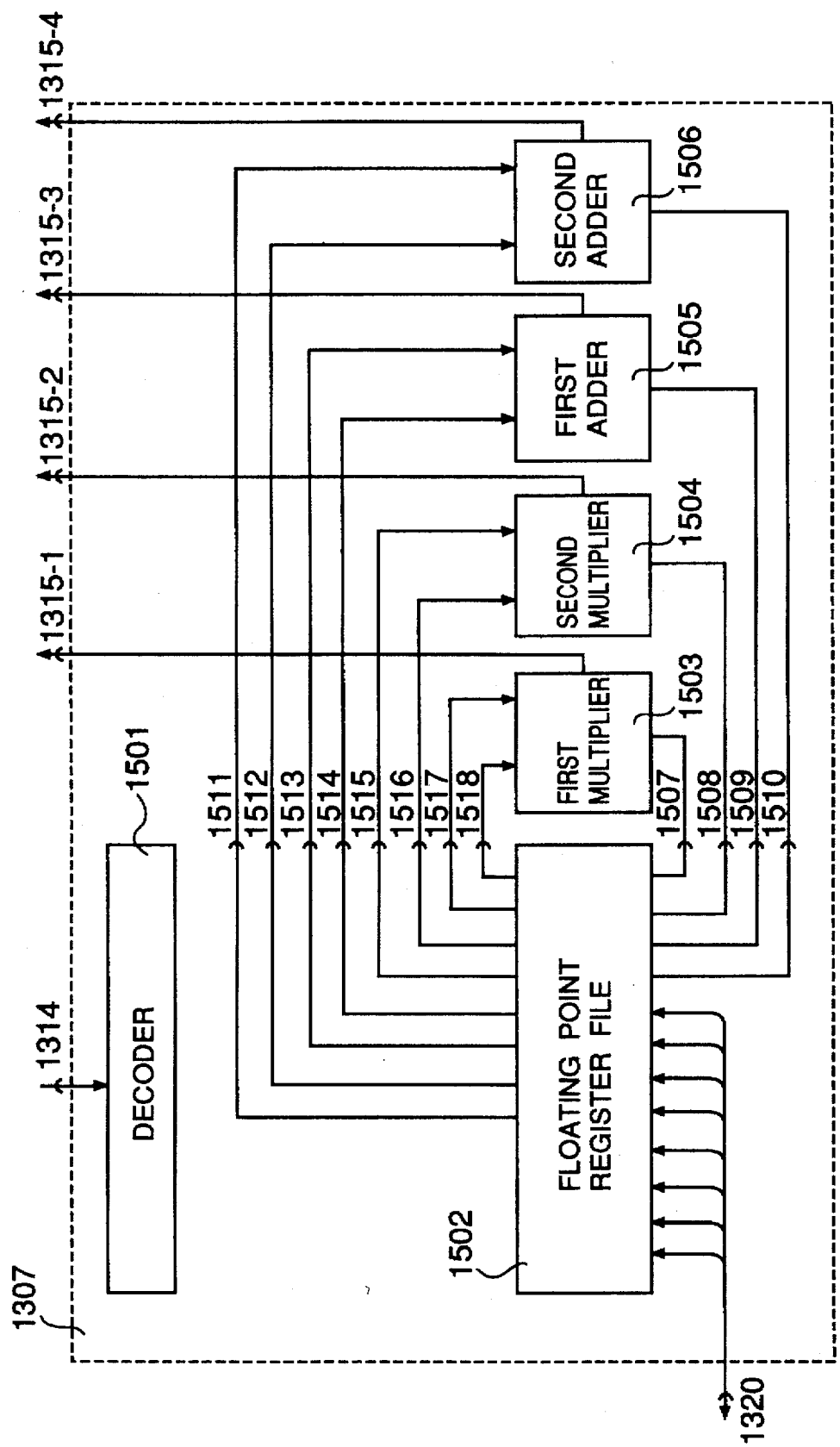
FIG. 15 is a block diagram showing a floating point operating unit.

FIG. 15 shows the detail of the floating point operating unit 1307 shown in FIG. 13. A numeral 1501 denotes a decoder. A numeral 1502 denotes a floating point register file. A numeral 1503 denotes a first multiplier. A numeral 1504 denotes a second multiplier. A numeral 1505 denotes a first adder. A numeral 1506 denotes a second adder. The floating point register file 1502 serves to send out data to the first multiplier 1503 through source buses 1517 and 1518, the second multiplier 1504 through source buses 1515 and 1516, the first adder 1505 through source buses 1513 and 1514, the second adder 1506 through source buses 1511 and 1512. Each operated result is given back to the floating point register file through target buses 1507, 1508, 1509 and 1510 for writing it therein.

1315-1 denotes a flag of the first multiplier 1503. 1315-2 denotes a flag of the second multiplier 1504. 1315-3 denotes a flag of the first adder 1505. 1315-4 denotes a flag of the second adder 1506.

Figure 16:
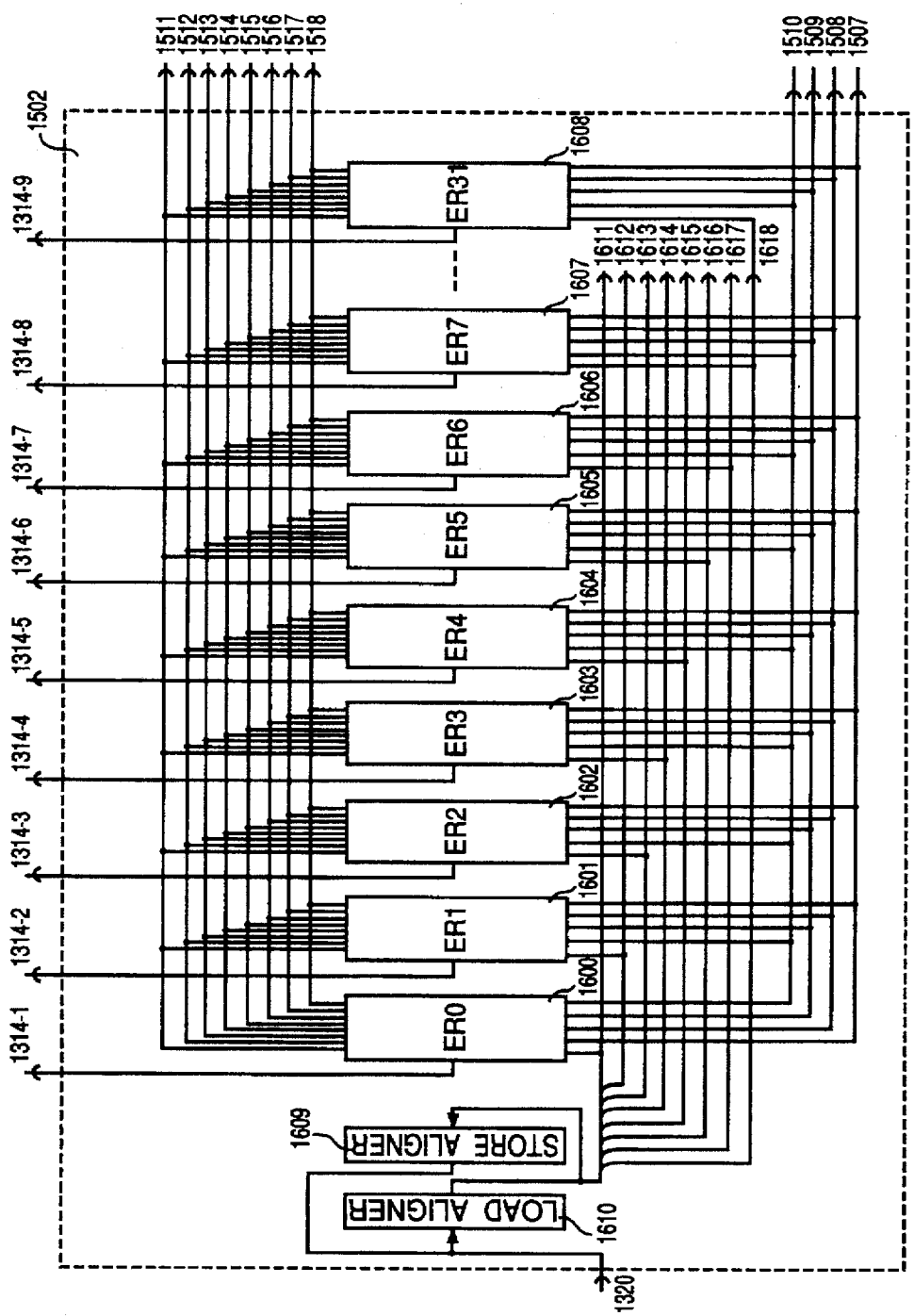
FIG. 16 is a block diagram showing a floating point register file.

FIG. 16 shows the detail of the floating point register file 1502. Numerals 1600 to 1608 denote floating point registers. Numerals 1314-1 to 1314-9 denote control signals of the floating point registers 1600 to 1608, respectively. A numeral 1610 denotes a load aligner. A numeral 1609 denotes a store aligner. Numerals 1611 to 1618 denote buses connecting between the floating point registers 1600 to 1608 and memories. The bus 1611 is connected to the FR0 16 and 12 and the bus 1612 is connected to the registers FR1, 9, 17 and 25. So are the buses 1613, 1614, 1615, 1616 and 1617. The bus 1618 is connected to the FR7, 15, 23 and 31. When executing the load instruction, the data sent through the bus 1320 is put on a desired one of the buses 1611 to 1618 through the effect of the load aligner 1610 and then is written in a desired register. When executing the store instruction, the data is read from the register to the buses 1611 to 1618 and then is output to a desired location of the bus 1320 through the effect of the store aligner 1609.

Figure 17:
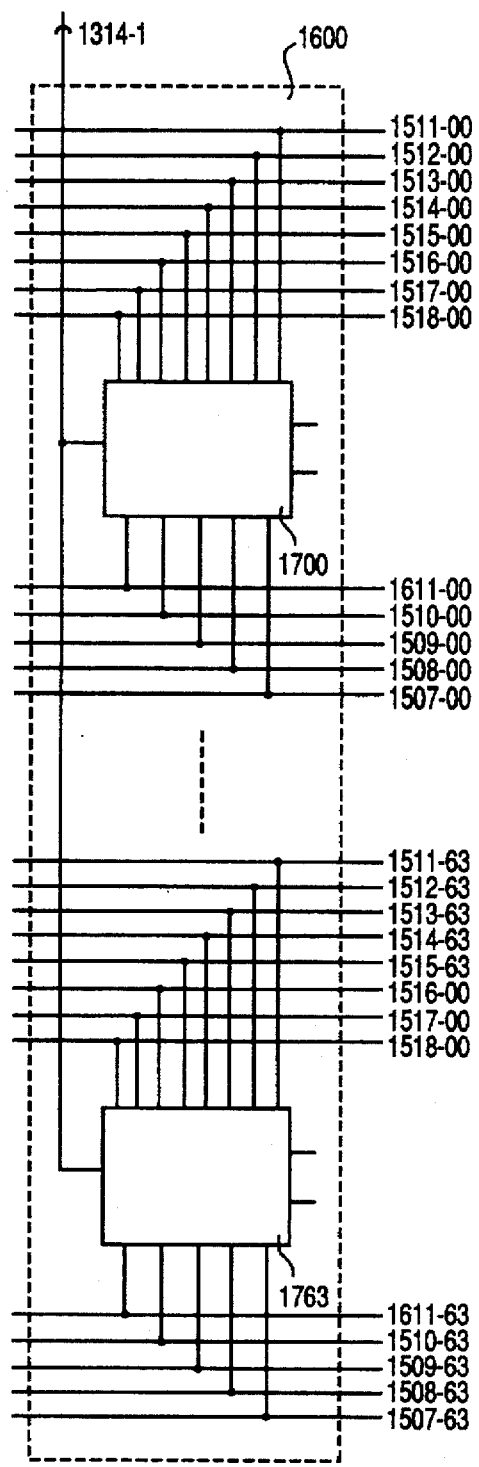
FIG. 17 is a block diagram showing a floating point register.

FIG. 17 shows a first embodiment of the floating point register 1600 shown in FIG. 16. 1601 to 1608 are the same as the register 1600. As shown in FIG. 17, the register 1600 is a set of 64-bit registers. Numerals 1700 to 1763 denote one-bit registers, respectively. Numerals 1511-00 to 15180-00 denote readout buses of the register 1700. Numerals 1507-00 to 1518-00 denote write buses of the register 1700. A numeral 1611-0 denotes a read and write bus of the register 1700. So is the bus arrangement of the register 1763.

Figure 28:
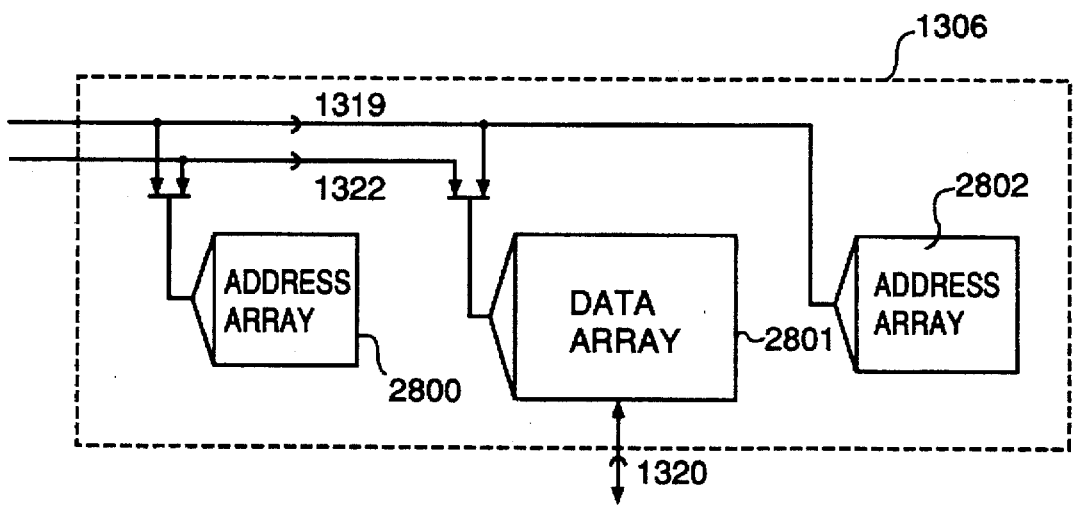
FIG. 28 is a circuit diagram showing the detail of a data cache.

FIG. 28 shows the detail of the data cache shown in FIG. 13. A numeral 2801 denotes a data array for holding data. A numeral 2800 denotes an address array used for a load and store operation. A numeral 2802 denotes an address array for prefetching. The address arrays 2800 and 2802 hold the same data. When executing the load and store one-word instruction, the address array 2800 and the data array 2801 are accessed through the buses 1319 and 1322. When executing a load and store four-word instruction, the address array 2800 and the data array 2801 are accessed through the bus 1322. The address array 2802 is accessed for prefetching through the effect of the bus 1319.

FIG. 29 shows a pipeline arrangement for when a cache miss takes place in the load and store operation. The pipeline is locked while the data is transferred from the memory to the cache memory. In FIG. 29, $\phi$ denotes a locking period.

On the other hand, when performing a prefetching operation, nothing is done if the address array 2802 is hit. If a miss hit appears in an address, the block containing the address is transferred from the memory to the data array 2801 through a bus. During the period, the pipeline is locked. By setting a prefetching operation before a load and store operation having a miss-occurring possibility, the transfer of the data from the memory to the cache memory is carried out in parallel to another operation. It is therefore possible to avoid lowering of the performance resulting from the locked pipeline.

Figure 18:
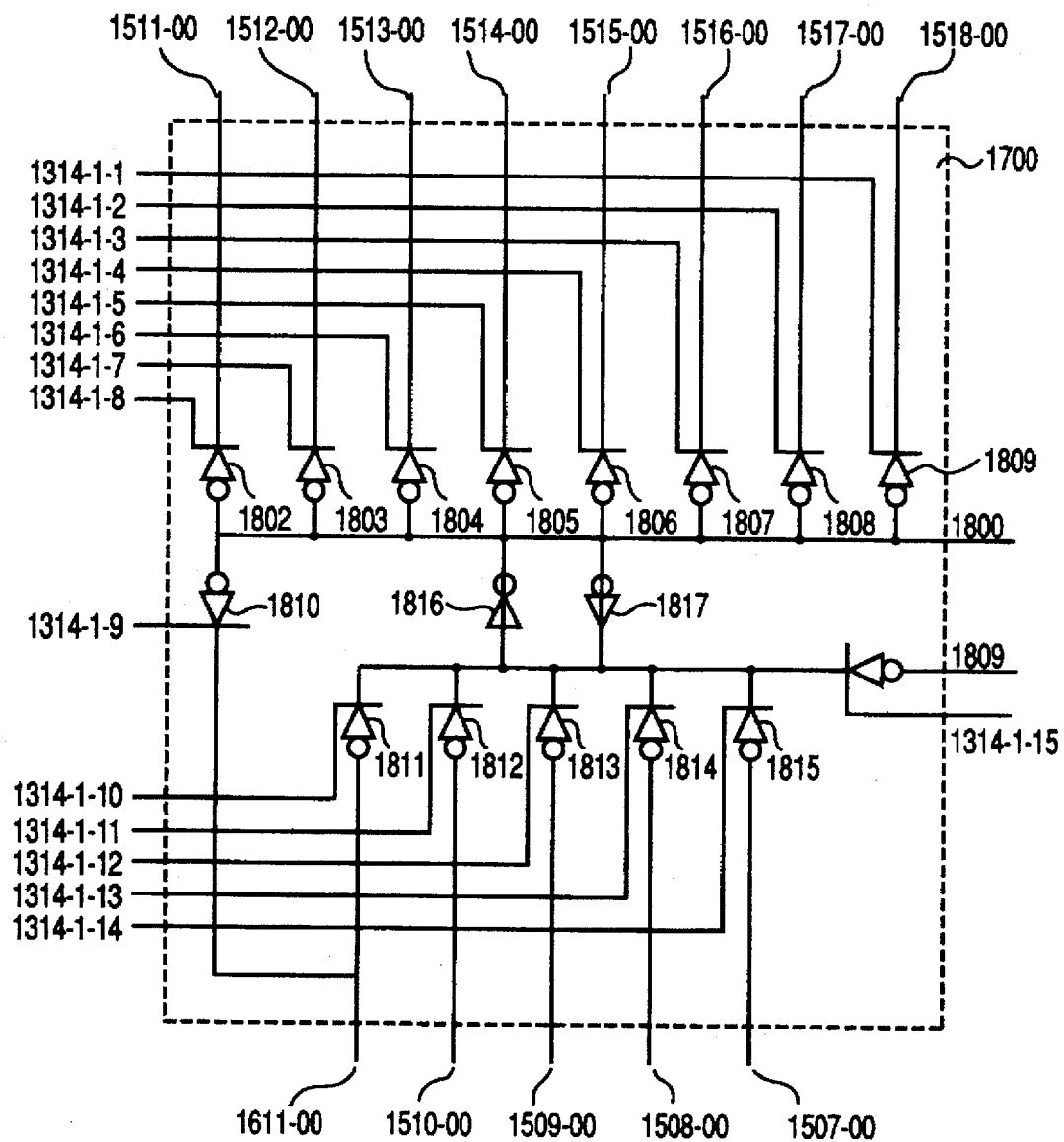
FIG. 18 is a circuit diagram showing a one-bit part of the floating point register.

FIG. 18 shows a circuit arrangement of the register 1700 shown in FIG. 17. Numerals 1816 and 1817 denote inverters. Numerals 1802 to 1815 denote clocked inverters. When the control signals 1314-1 to 1314-8 go up to a high level, the registers output their values to the buses 1511-00 to 1518-00. When the signals 1314-1-10 to 1314-1-14 go up to a high level, the values on the buses 1510-00 to 1507-00 are written in the registers. When the signal 1314-1-9 goes up to a high level, the value is output from the register to the bus 1611-00. When the signal 1314-1-10 goes up to a high level, the value on the bus 1611-00 is written in the register. A signal 1800 corresponds to an extra readout port and a signal 1801 corresponds to an extra write port. The way of use of these signals will be described later.

Figure 19:
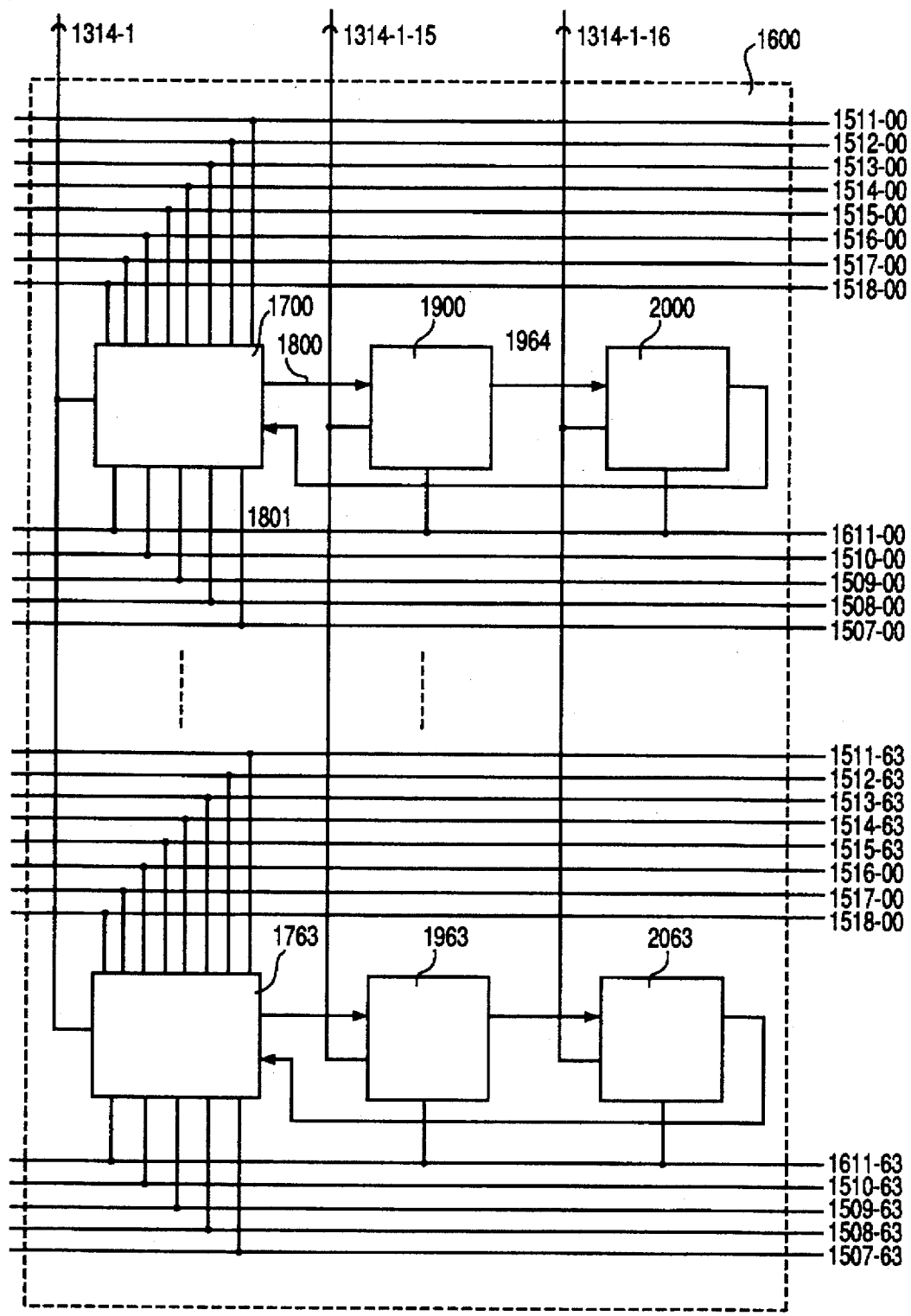
FIG. 19 is a block diagram showing a floating point register.

FIG. 19 shows a second embodiment of the floating point register 1600 shown in FIG. 16. The embodiment shown in FIG. 19 is different from that shown in FIG. 17 in the respect that first shadow registers 1900 to 1963 and second shadow registers 2000 to 2063 are added. The first shadow register 1900 serves to pass the signal 1800 so that it can read a value stored in the register 1700. Further, the register 1900 serves to pass the signal 1964 so that it can send out a value to the second shadow register 2000. The second shadow register 2000 serves to send out its value to the register 1700 through the signal 1801. That is, the registers 1700 to 1763, the first shadow registers 1900 to 1963 and the second shadow registers 2000 to 2063 compose a ring-like shift register. Like the registers 1700 to 1763, the first shadow registers 1900 to 1963 and the second shadow registers 2000 to 2063 are capable of reading and writing data through the buses 1611-00 to 1611-63. A numeral 1314-1-15 denotes a control signal of the first shadow registers 1900 to 1963. A numeral 1314-1-16 denotes a control signal of the second shadow registers 2000 to 2063.

The object of the shadow register is to allow return from an interrupt when executing a four-word instruction. How the shadow register operates will be described as referring to FIGS. 20 to 22. A W' stage is a stage at which a value is written from the register to the first shadow register FRS1. A W" stage is a stage at Which a value is written from the shadow register FRS1 to the second shadow register FRS2.

FIG. 20 shows an operation of a four-word instruction at a normal time when no interrupt takes place. Figures on the time charts FR, FRS1 and FRS2 indicate the instructions about which the operated results are stored in the registers, respectively. As shown in FIG. 20, at a normal time, the operated result is shifted from the FR to the FRS1 and the FRS1 to the FRS2 at one cycle pitch.

FIG. 21 shows an operation appearing when an interrupt takes place between the instructions 3 and 4. The instructions 4, 5, 6, 7 are nullified. Each register stops updating of a value after an interrupt takes place. The FR holds an operated result of the instruction 3. The FRS1 holds an operated result of the instruction 2. The FRS2 holds an operated result of the instruction 1. An interrupt vector is set to the program counter. The interrupt processing program starting from the interrupt vector operates to save the values of the FR, the FRS1 and the FRS2 in the memory.

FIG. 22 is a view for explaining a returning operation from the interrupt processing. At the final stage of the interrupt processing program, as shown in FIG. 22, the operated result of the instruction 1 is returned to the FR. The operated result of the instruction 2 is returned to the FR2. The operated result of the instruction 3 is returned to the FR1. At an E stage of the instruction 4 for reading data from the register, the operated result of the instruction 1 is allowed to be viewed. After terminating the E stage of the instruction 4, the value of the FR is copied to the FRS1, the value of the FRS1 is copied to the FRS2 and the value of the FRS2 is copied to the FR. As a result, at an E stage of the instruction 5, the operated result of the instruction 2 is allowed to be viewed. After terminating the E stage of the instruction 5 for reading data from the register, at the E stage of the instruction 6 for reading data from the register, the operated result of the instruction 3 is allowed to be viewed by the similar operation. The subsequent process is true to the normal process. That is, each time one instruction is executed, the value is copied from the FR to the FRS1 and the FRS1 to the FRS2. The value of the FRS2 is discarded.

As described above, the shadow registers are provided to accept an interrupt when executing a delay writing instruction and return to the original stage. The lack of the shadow registers allows only the operated result of the instruction 3 to be saved as shown in FIG. 21. It means that the instruction 4 does not have any function of viewing the operated result of the instruction 1 when returning to the original stage from the interrupt as shown in FIG. 22. This is because the instructions 2 and 3 may instruct to write the values in the same register as the instruction 1. For example, in the program shown in FIG. 12, the instruction 3 instructs to write the data in the same register as the instruction 1.

The increase of hardware resulting from the addition of the shadow register will be described later. The size of the register is substantially proportional to the number of ports. As is obvious from the comparison between FIGS. 17 and 19, the number of the ports provided in the shadow register is 3, which is far smaller than the number of the ports provided in the register, that is, 13. Hence, the increase of the hardware resulting from the addition of the shadow register is negligible.

Figure 41:
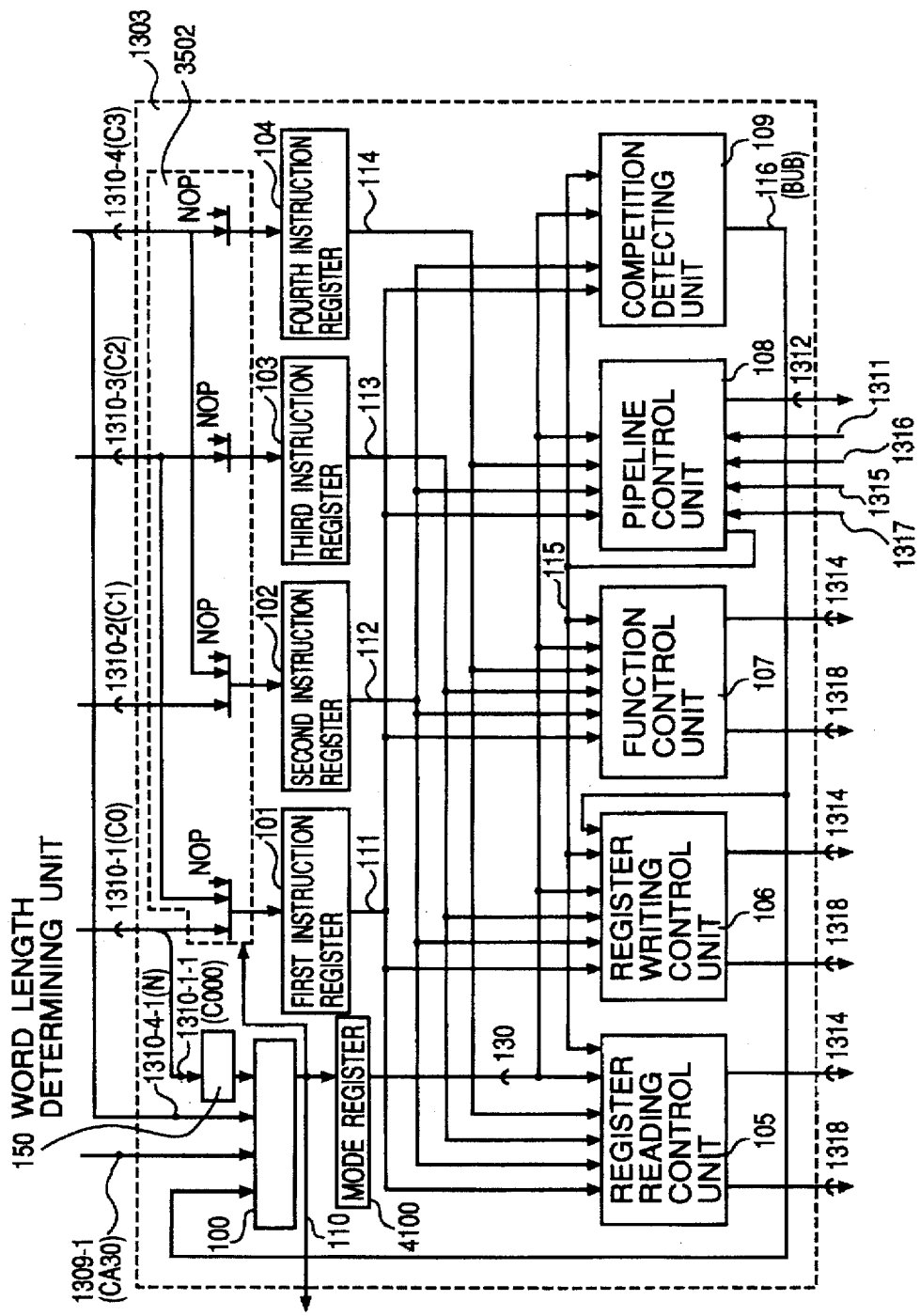
FIG. 41 is a detailed view of FIG. 1.

FIG. 41 shows an embodiment of the instruction control unit 1303 shown in FIG. 13. A numeral 150 denotes an instruction word length determining unit. A numeral 101 denotes a first instruction register. A numeral 102 denotes a second instruction register. A numeral 103 denotes a third instruction register. A numeral 104 denotes a fourth instruction register. A numeral 4100 denotes a mode register. A numeral 100 denotes a mode control circuit. A numeral 105 denotes a register reading control circuit. A numeral 106 denotes a register writing control circuit. A numeral 107 denotes a function control circuit. A numeral 108 denotes a pipeline control circuit. A numeral 109 denotes a competition detecting circuit.

It is assumed that the four-word instruction is located in a manner not to bridge a border between the adjacent four words and the one-word instruction is executed each two words surrounded by a two-word border at a time. In this embodiment, the instruction word length determination is carried out by viewing the leftmost bit of an operation code, that is, the signal 1310-1-1 (C000) itself of FIG. 41.

Figure 27:
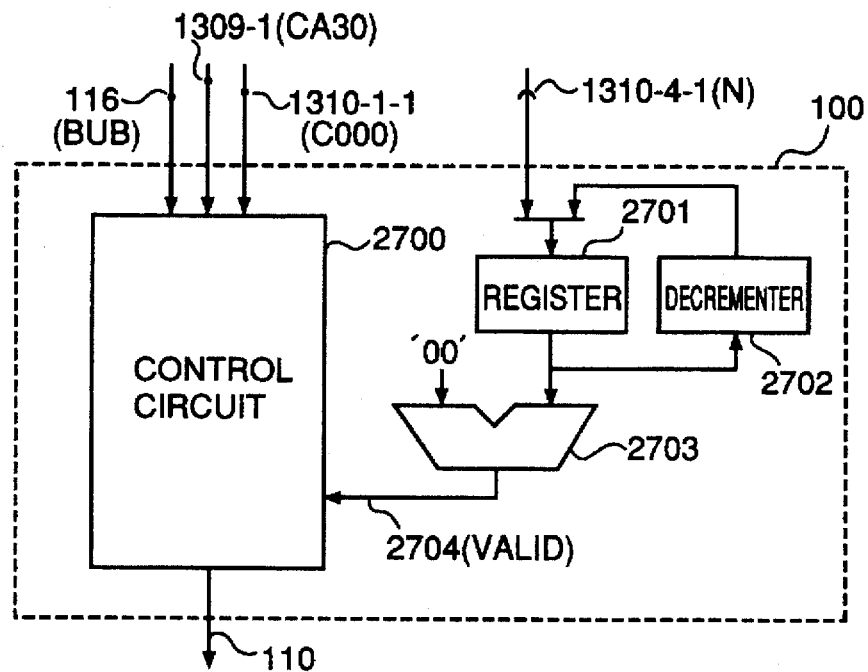
FIG. 27 is a circuit diagram showing the mode control circuit in detail.

FIG. 27 shows the detail of the mode control circuit 100. In FIG. 27, a numeral 2700 denotes a control circuit. A numeral 2701 denotes a register for holding an N field 1310-4-1. A numeral 2702 denotes a decremeter. A numeral 2703 denotes a comparator. The comparator 2703 serves to send out an output signal VALID (2704) to the control circuit 2700. The value of the N field set to the register 2701 is decremented by one at each one cycle by the decrementer 2702. When the N field reaches 00, the signal VALID (2704) is asserted. The signal VALID indicates insertion of a no-operation cycle when it is negated and execution of an instruction when it is asserted.

The control circuit 2700 serves to check an output 116 of the competition detecting circuit (BUB), a lower 32nd bit of the instruction address 1309-1 (CA30), a bit 1310-1-1 (C000) indicating whether or not the instruction consists of four words in the operation code, and a signal 2704 (VALID). Then, the control circuit 2700 determines the current mode of the five modes. As shown in FIG. 23, the control circuit 2700 sets an operation code to the first to the fourth instruction registers and issues the signal 110 for incrementing the program counter.

The signal 110 indicating a mode to which the current cycle belongs is latched by the mode register 4100. The mode register 4100 serves to supply a signal 130 to the register reading control circuit 105, the register writing control circuit 106, the function control circuit 107, the pipeline control circuit 108, and the competition detecting circuit 109. As shown in FIG. 23, C0 to C3 denote four words within the four-word border in a manner that the words are ranged from a smaller address like C0, C1, C2, C3. From the leftmost bit C000 of C0, as shown in FIG. 3, it is possible to determine if the instruction is a one-word one or a four-word one. A one-word instruction mode 1 is a mode at which the two left instructions (C0, C1) inside of the four-word border are executed. At this mode, C0 is set to the first instruction register, C1 is set to the second instruction register, and the program counter PC is incremented by +2. A one-word instruction mode 2 is a mode at which the two right instructions (C2, C3) inside of the four-word border are executed. At this mode, C2 is set to the first instruction register, c3 is set to the second instruction register, and the program counter PC is incremented by +2. That is, when executing a one-word instruction, the first and the second instruction registers are made operative, while the third and the fourth instruction registers are not made operative. A four-word instruction mode is a mode at which a four-word instruction (C0, C1, C2, C3) is executed. At this mode, C0 to C3 are set to the first to the fourth instruction registers and the program counter PC is incremented by +4. A competition mode appears when the competition detecting circuit 109 detects a competition. The first to the fourth instruction registers and the mode register 4100 hold the value of the previous cycle. Further, at this mode, no update of the program counter PC is performed. A no-operation instruction mode appears when insertion of a no-operation instruction (NOP) to the current cycle by hardware is indicated by an N field having a four-word instruction executed before the current cycle. The no-operation instruction is set to the instruction register and the program counter PC is not updated. As a result, one no-operation cycle is inserted.

When executing a one-word instruction, for executing the C0 or C2, the first ALU 1401 (see FIG. 14), the first multiplier 1503 (see FIG. 15), and the first adder 1505 (see FIG. 15) are used, while for executing the C1 or C3, the second ALU 1402 (see FIG. 14), the second multiplier 1504 (see FIG. 15) and the second adder 1506 (see FIG. 15) are used. When executing a four-word instruction, the address calculation for a load and store operation is executed in the first ALU 1401 (see FIG. 14), the integer operation is executed in the second ALU 1402 (see FIG. 14), the first floating point operation is executed in the first multiplier 1503 (see FIG. 15), the second floating point operation is executed in the first adder 1505 (see FIG. 15), the third floating point operation is executed in the second multiplier 1504 (see FIG. 15), and the fourth floating point operation is executed in the second adder 1506 (see FIG. 15).

The register reading control circuit 105, the register writing circuit 106 and the function control circuit 107 shown in FIG. 41 serve to generate a control signal 1318 of the integer operation unit 1304 (see FIG. 13) by using the mode specifying signal 110 output from the mode control circuit and the values of the first to the fourth instruction registers according to the foregoing rules for allocation of the operating unit. The further detail of the register reading control circuit will be shown in FIG. 24, which shows which field of the operation code is used for specifying the registers input to two inputs of each of the six operating units. The abbreviations of the fields are shown in the columns of the compound instructions shown in FIG. 3. The four-word instructions J1 and A1 are located at the position of the one-word instruction S2 and the four-word instructions J2 and A2 are located at the position of the one-word instruction S2. By making use of this locational arrangement, the field specification shown in FIG. 24 is described by using J1, J2, A1 and A2 when executing a one-word instruction. This is for distinguishing C0 from C1.

Next, the description will be oriented to the competition detecting circuit 109 shown in FIG. 41. As described with respect to FIGS. 7 to 9, this embodiment is not required to detect a competition between the four-word instructions. Since all the operating units for executing a one-word instruction are doubled, no competition of the operating unit takes place between the two one-word instructions executing in parallel. For simplifying the description, no register competition takes place. The expansion of this embodiment to the register competition is made easy as described in the Japanese Patent Application No. 63-283673. As mentioned above, two no-operation four-word instructions are required to be placed between an effective four-word instruction and the next one-word instruction. Hence, no competition takes place between the four-word instruction and the one-word instruction. It means that the competition detecting circuit just needs to detect the one-word instruction of the current cycle and the one-word instruction executed before the cycle. Under the control of the mode control circuit 100, a one-word instruction is set to only the first and the second instruction registers 101 and 102. Hence, the competition detecting circuit 109 needs to view the first and the second instruction registers 101 and 102 only. It means that the circuit 109 does not need to view the third and the fourth instruction registers 103 and 104.

Figure 25:
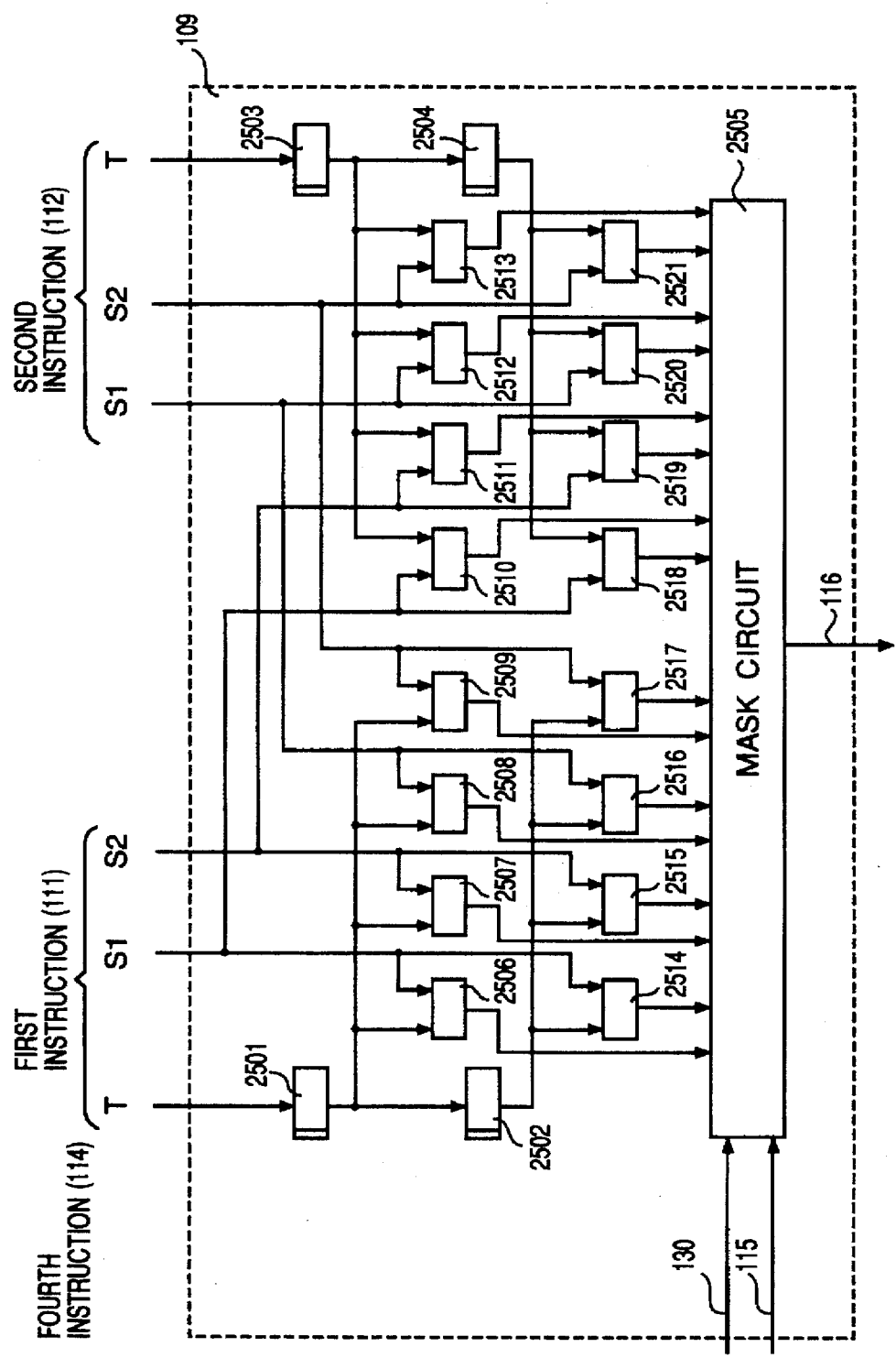
FIG. 25 is a block diagram showing a competition detecting circuit.

FIG. 25 is a block diagram showing the embodiment of a competition detecting circuit 109. Numerals 2501 to 2504 denote registers. A numeral 2505 denotes a mask circuit. Numerals 2506 to 2521 denote comparators. In FIG. 7, considering that the instructions 7 and 8 are current ones, the competition among the instructions 3 to 6 is considered to be detected. The E stage of the instructions 7 and 8 comes next to the S stage of the instructions 1 and 2. Hence, no competition between the instructions 1, 2 and 7, 8 takes place. As shown in FIG. 25, the register 2501 stores a number of the register written by the instruction 5, the register 2503 stores a number of the register written by the instruction 6, the register 2502 stores a number of the register written by the instruction 3, and the register 2504 stores a number of the register written by the instruction 4. The four registers and the numbers of the four registers read from the instructions 7 and 8 are compared by sixteen comparators 2506 to 2521. As a result, the compared result is sent to the mask circuit 2505. The mask circuit 2502 serves to view the output 130 of the mode control circuit 100 and the output 115 of the pipeline control circuit 108 for determining whether or not a hit signal of the comparator is effective. If yes, the signal 116 indicating the competition is asserted. That is, even if the output of the comparator indicates a match of the registers, the signal 116 is negated if the instruction is nullified. When the mode signal 130 indicates a four-word mode, the mask circuit 2505 serves to negate the signal 116.

Next, the description will be directed to the pipeline control circuit 108. The pipeline control circuit 108 serves to send out a mode signal 130, a flag signal 1317 from the integer operating unit 1304 shown in FIG. 13, and a flag signal 1315 from the floating point operating unit 1307 in FIG. 13. Further, the circuit 108 sends out a control signal 1312 of the branch unit 1302 in FIG. 13 through the effect of the interface 1316 with the data cache controller in FIG. 13 and the interface 1311 with the instruction cache controller in FIG. 13 for the purpose of controlling the branch unit. That is, when an effective branch instruction comes to the circuit 108, the circuit 108 serves to operate the branch unit 1302. At the other time, by using the mode signal 110, the circuit 108 serves to control the program counter located in the branch unit shown in FIG. 23. The pipeline control circuit 108 serves to send out the signal 115 to the register reading control circuit 105, the register writing control circuit 10, the function control circuit 107, and the competition detecting circuit 109 for controlling the state of the pipeline. That is, if a miss takes place when accessing the instruction cache or data cache, as shown in FIG. 29, the pipeline is locked.

In turn, a first transformation of the foregoing embodiment will be described. The foregoing embodiment is arranged to reflect the operated result of the four-word instruction on the fourth instruction from the current (first) instruction for eliminating the necessity of the competition detecting unit between the four-word instructions. To achieve the similar effect, the embodiment may be arranged to reflect the operated result of the four-word instruction on the next instruction but to avoid the competition among the four-word instructions by using the compiler. Concretely, when a four-word instruction instructs to write data in a register, the next two four-word instructions do not read the data from that register. This arrangement loses the effect of substantially increasing the number of the registers according to the first embodiment but does not need to provide the shadow registers shown in FIG. 19.

Further, a second transformation of the foregoing embodiment will be described. The embodiment shown in FIG. 3 provides in an instruction a bit indicating if the instruction is a one-word or a four-word one. In place, a flag indicating if the instruction is a one-word or a four-word one is provided in the computer so that this flag is controlled by the instruction. This arrangement requires an instruction for controlling the flag is required but does not advantageously need to indicate the word length in each instruction merely by switching the flag once.

Figure 30:
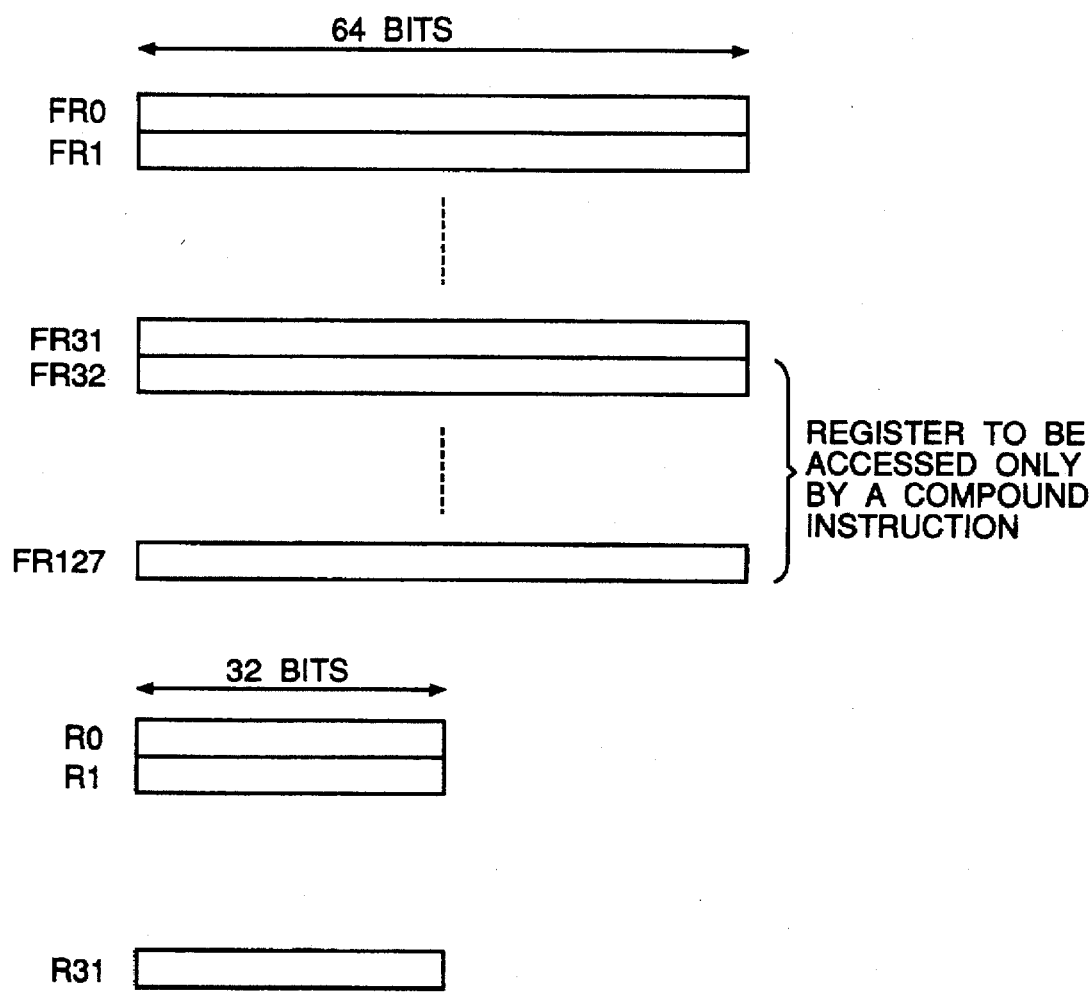
FIG. 30 is a view showing another embodiment of the invention.

A third transformation of this embodiment will be described as referring to FIGS. 30 to 32. Like FIG. 30, this transformation is arranged to expand the number of the floating point registers from 32 to 128. FIG. 31 shows an instruction format and FIG. 32 shows an instruction. The FR0 to 31 are usable by both of the basic instruction and the compound instruction. The FR32 to FR127 are the registers to be usable only by the compound instruction. Each of the fields for specifying the registers I1, IT, MI, MT, A1, AT, N1, NT, B1 and BT includes seven bits as shown in FIG. 32, which are more than the foregoing embodiment. This transformation is arranged to match one side of the source register to the target register for accommodating the total instruction in four words. If it is not desirous, the word length may be made longer. This transformation is arranged to add the compound instruction to the basic instruction so that more registers than those used by the basic instruction are allowed to be treated by the compound instruction. As such, the usable registers can be increased in number. This transformation allows the FR0 to FR31 to be accessed by both of the basic instruction and the compound instruction. In place, it is possible to independently provide 32 registers for the basic instruction and 128 registers for the compound instruction.

Further, as shown in FIG. 32, the transformation is arranged to specify the number of words to be prefetched when prefetching data from the memory to the cache by the JT field. With this arrangement, the instruction is allowed to instruct to transfer a plurality of blocks at a time. This yields an effect of enhancing a utilization.

In turn, a fourth transformation of the foregoing embodiment will be described as referring to FIGS. 33 and 34. The different respect of the fourth transformation is that prefetch of the data is carried out not by the integer operating fields such as J1, J2, and JT but by a one-bit P field. In the case of P=1, the block next to the block containing an address used in the load and store operation is prefetched. This operation has a capability of conserving the field needed for prefetching and offering an advantage of specifying three operations of a load and store operation, an integer operation and a prefetch operation in parallel.

Figure 35:
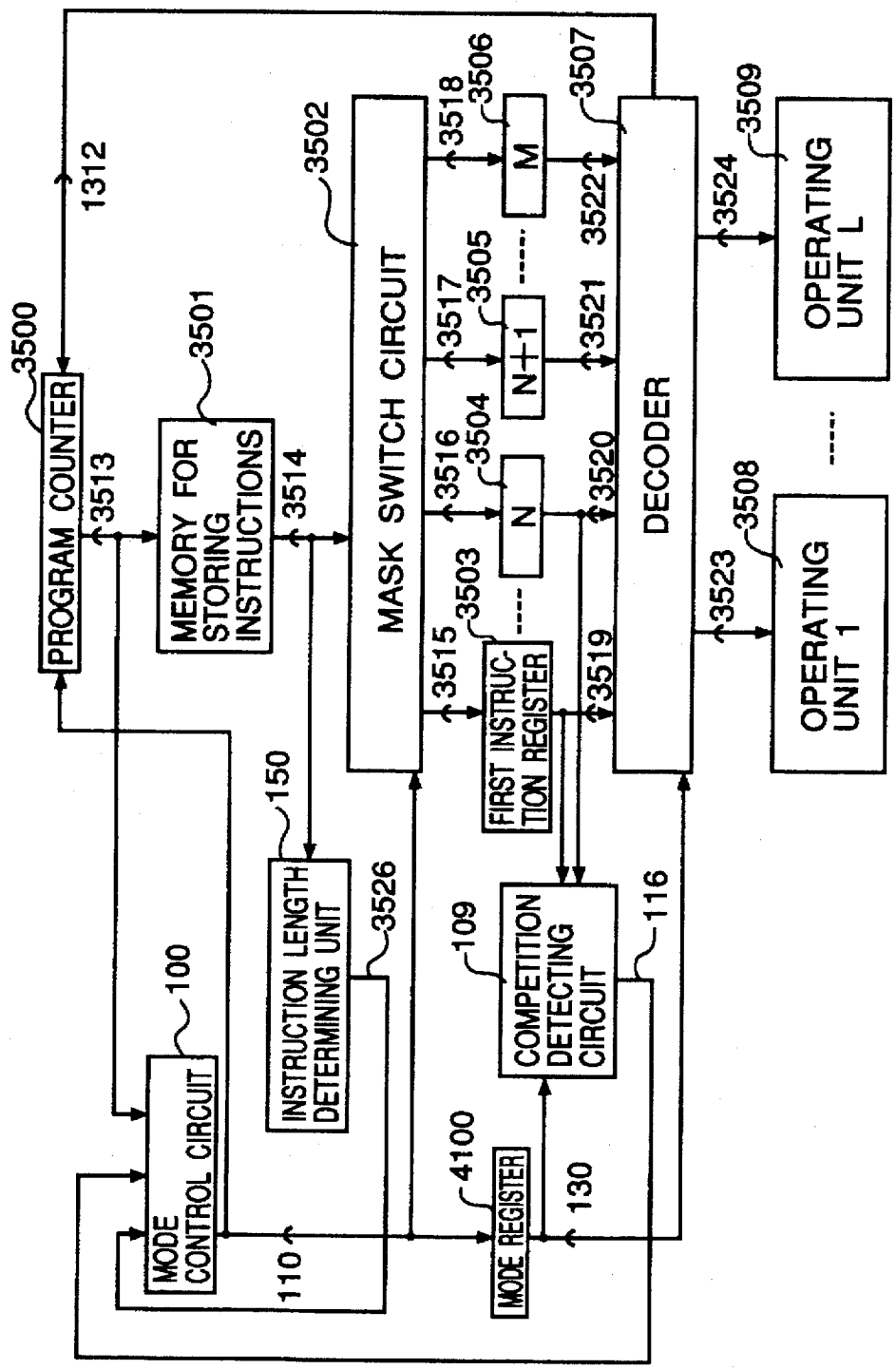
FIG. 35 is a view showing the embodiment shown in FIG. 30.

FIG. 35 is a block diagram used for explaining another embodiment. In FIG. 35, a numeral 3500 denotes a program counter. A numeral 3501 denotes a memory for storing instructions. A numeral 3502 denotes a mask switch circuit. Numerals 3503 to 3506 denote M instruction registers each having an n-byte length. A numeral 3507 denotes a decoder. Numerals 3508 and 3509 denote L (L≧1) operating units. A numeral 150 denotes an instruction length determining unit. A numeral 109 denotes a competition detecting circuit. A numeral 100 denotes a mode control circuit. A numeral 4100 denotes a mode register. The program counter 3500 sends out an instruction address 3513 to the memory 3501 for storing instructions. In the memory 3501, n-byte length instructions and n×M byte length instructions are stored in a mingling manner. The memory 3501 serves to send out a plurality of instructions containing an instruction indicated by the instruction address 3513 to the mask switch circuit 3502. If the instruction has n bytes, the mask switch circuit 3502 sets the instruction to at least one of N (1≦N<) instruction registers 3503 to 3504 inside of the M instruction registers. If the instruction has n×M bytes, the mask switch circuit 3502 sets the instruction to the instruction registers 3503 to 3506. The decoder 3507 serves to decode the instructions 3519 to 3522 from the instruction registers 3503 to 3506 and control one operating unit by using the control signals 3523 and 3524. The instruction length determining unit 150 views at least part of the instruction 3514 and sends out to the mode control circuit 100 a signal 3526 indicating an instruction length. The competition detecting circuit 109 views the instruction registers 3503 to 3504 and sends out to the mode control circuit 100 a signal 116 indicating the presence or absence of a competition between n-byte instructions. The mode control circuit determines the current mode based on the instruction length, the presence of a competition and a value of the program counter and sends out a control signal 110 for controlling the program counter, the mask switch circuit and the decoder.

Next, the correspondence between this embodiment and the embodiments shown in FIGS. 1 to 29 and 41 will be described. The embodiment shown in FIGS. 1 to 29 has been arranged on the assumption that n=4, M=4, N=2 and L=2 and the operating unit means the integer operating unit and the floating point operating unit. Further, the mask switch circuit shown in FIG. 35 corresponds to a selector for generating instructions to be set to the first to the fourth instruction registers 101 to 104 and a mask operated by an NOP. The competition detecting circuit 109 shown in FIG. 35 corresponds to the competition detecting circuit 109 shown in FIG. 41. The instruction length determining unit 150 shown in FIG. 35 corresponds to the instruction length determining unit 150 shown in FIG. 41. The mode control circuit 100 shown in FIG. 35 corresponds to the mode control circuit 100 shown in FIG. 41.

Figure 39:
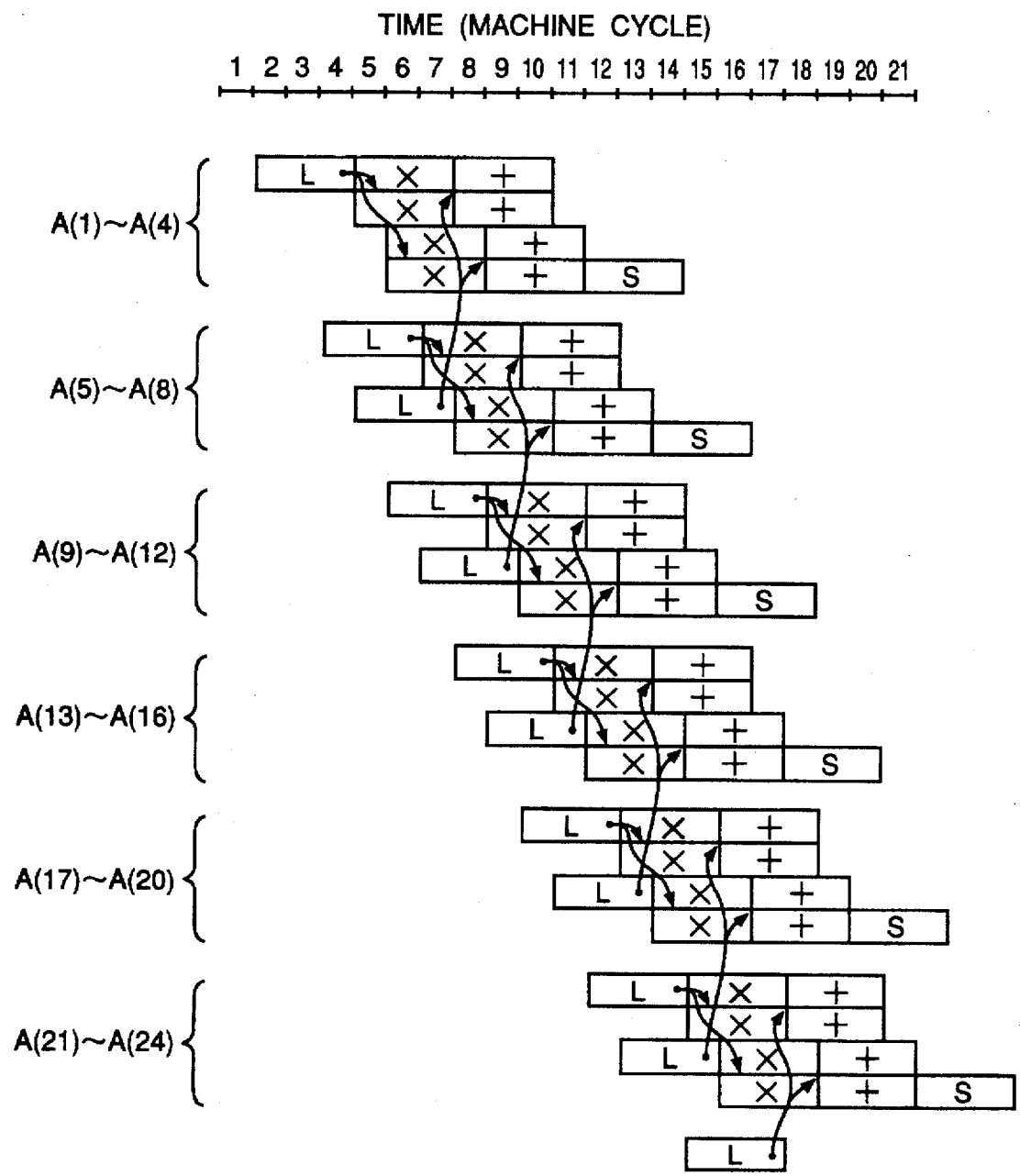
FIG. 39 is a view showing the embodiment shown in FIG. 30.

The embodiments shown in FIGS. 3, 5, 10, 11 and 12 have a shortcoming that the data location on the memory is restricted. The embodiment shown in FIGS. 36 to 40 overcomes this shortcoming. The compound instruction of this embodiment is capable of executing two memory operations such as load or store by one instruction. In light of the hardware, the cache is arranged to have two ports or access the memory twice for one machine cycle. FIGS. 39 and 40 show a program for solving the same problem as that shown in FIGS. 11 and 12.

The embodiments having been described above are devised, in a computer having both of long-word instructions and short-word instructions, to reflect an operated result of a long word instruction on and from any later instruction or allow a long instruction to specify a number of no-operation instructions succeeding to the next instruction. Or, the long instruction is devised to provide a first field for transferring data from the memory or the cache memory to the register and a second field for transferring data from the memory to the cache memory. These devices are effective to the VLIW computer having only long-word instructions.

As set forth above, this embodiment is arranged to use a four-word instruction for specifying seven operations with the four words. The competition detection is carried out by the 4×4=16 comparators. To detect the competition among the four-word instructions by hardware, it is necessary to provide six writing registers for operations except a branch operation of the previous cycle and six writing registers for operations of the cycle previous to the previous cycle and to detect a competition among twelve reading registers of the current cycle. As such, (6+6)×12=144 comparators are required in total. On the other hand, this embodiment has an advantage of needing just 16/144 hardwares.

According to this embodiment, the short-word instruction processed for one machine cycle indicates two operations, while the four-word instruction indicates seven operations. Hence, the competition detecting circuit for the two operations has an effect of executing seven operations at maximum in parallel.

The invention has an effect of increasing the number of operations to be executed in parallel for enhancing the performance.

The invention has another effect of reducing the code size. This results in enhancing a hit ratio of the code cache, thereby enhancing the performance.

The invention has another effect of facilitating detection of a competition among the operations executed in parallel by hardware. This effect makes contribution to enhancing a machine cycle, reducing the amount of hardware and lowering the cost. In particular, when the number of operations specified by a long instruction is large, this effect is remarkable.

This invention has another effect of facilitating detection of a competition or queuing between the instruction executed before the current cycle and the instruction executed at the current cycle. This effect makes great contribution to enhancing the machine cycle, reducing the amount of hardware and lowering the cost.

This invention has another effect of substantially increasing the registers using the software in number and executing the optimization on the software for increasing the number of operations executed in parallel, thereby enhancing the performance.

The invention has another effect of keeping upward compatibility with the conventional architecture.

What is claimed is:

1. A data processing apparatus for processing instructions, comprising:

an instruction control unit which receives instructions and decodes said instructions into operations, said instructions including long length instructions and short length instructions, wherein no conflicts exist among said long length instructions and each of said long length instructions has n operations where n is an integer greater than one, and each of said short length instructions has m operations, where m is an integer and m is less than n; and an operation unit which receives said operations from said instruction control unit and executes in parallel operations of long length instructions when long length instructions have been detected, or operations of at least two short length instructions for which a conflict has not been detected or executes operations of one short length instruction when a conflict has been detected, wherein said instruction control unit comprises:
an instruction length detector which detects whether an instruction is a short length instruction or a long length instruction, and
a conflict detector which detects a conflict between short length instructions.

2. A data processing apparatus according to claim 1, wherein the number of n operations of each of said long length instructions is greater than the number of m operations of each of said short length instructions times the number of l of short length instructions that can be processed in one machine cycle, where l is an integer greater than 1.

3. A data processing apparatus according to claim 1, further comprising a memory which stores said instructions and outputs said instructions to said instruction control unit.

4. A data processing apparatus according to claim 3, wherein said memory is an instruction cache memory.

5. A data processing apparatus according to claim 1, wherein said instruction control unit further comprises:

a plurality of registers which store operations of said decoded instructions; and a selector which selects for storage in said registers operations of a long length instruction when a long length instruction has been detected and at least an operation of a short length instruction when a short length instruction has been detected.

6. A data processing apparatus according to claim 1, wherein said conflict detector detects a conflict between short length instructions being supplied to said instruction control unit or between short length instructions being supplied to said instruction control unit and short length instructions being processed by said instruction control unit.

7. A data processing apparatus according to claim 1, wherein said operation unit comprises:

a plurality of processing units which execute operations in parallel.

* * * * *